US012485684B2

(12) United States Patent
Tamura et al.

(10) Patent No.: US 12,485,684 B2
(45) Date of Patent: Dec. 2, 2025

(54) IMAGE RECORDING APPARATUS

(71) Applicant: BROTHER KOGYO KABUSHIKI KAISHA, Nagoya (JP)

(72) Inventors: Hikaru Tamura, Okazaki (JP); Kengo Noda, Inazawa (JP); Gakuro Kanazawa, Toyokawa (JP); Nao Morimoto, Nagoya (JP); Yuya Tatematsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 106 days.

(21) Appl. No.: 18/173,845

(22) Filed: Feb. 24, 2023

(65) Prior Publication Data

US 2023/0271434 A1 Aug. 31, 2023

(30) Foreign Application Priority Data

Feb. 25, 2022 (JP) ................................ 2022-028343
Feb. 25, 2022 (JP) ................................ 2022-028371
Feb. 25, 2022 (JP) ................................ 2022-028407
Feb. 17, 2023 (JP) ................................ 2023-023280

(51) Int. Cl.
*B41J 11/58* (2006.01)

(52) U.S. Cl.
CPC .................................... *B41J 11/58* (2013.01)

(58) Field of Classification Search
CPC .. B41J 11/58; B41J 11/48; B65H 3/44; B65H 3/56; B65H 1/266; B65H 2405/332; B65H 2801/06; B65H 2801/12
See application file for complete search history.

(56) References Cited

U.S. PATENT DOCUMENTS

| | | | | |
|---|---|---|---|---|
| 6,123,329 | A | 9/2000 | Sato et al. | |
| 2016/0129700 | A1* | 5/2016 | Asada ...................... | B65H 5/38 347/104 |
| 2022/0212888 | A1 | 7/2022 | Tatematsu | |

FOREIGN PATENT DOCUMENTS

| | | | |
|---|---|---|---|
| JP | 5-69951 | A | 3/1993 |
| JP | 8-319039 | A | 12/1996 |
| JP | 10-198104 | A | 7/1998 |
| JP | 11-240630 | A | 9/1999 |
| JP | 2000-7174 | A | 1/2000 |

(Continued)

OTHER PUBLICATIONS

Mitsumoto Masao, “Paper Feeding Unit” (JP 2021054602 A), Apr. 8, 2021, [Description of Embodiments and Fig. 2] (Year: 2021).*

*Primary Examiner* — Lisa Solomon
(74) *Attorney, Agent, or Firm* — Merchant & Gould P.C.

(57) ABSTRACT

An image recording apparatus includes a first tray, a second tray overlapping the first tray in the first direction, a first roller configured to feed first sheet media in the first tray in a second direction, a second roller configured to feed second sheet media in the second tray in the second direction, a first separating member extending in a third direction intersecting both the first direction and the second direction, a second separating member extending in the third direction, and a recording unit. The second separating member is longer than the first separating member, and the second roller is positioned at the upstream side of the second tray with respect to the first roller in the second direction in a state where no sheet media are accommodated in the first tray and the second tray.

10 Claims, 23 Drawing Sheets

(56) References Cited

FOREIGN PATENT DOCUMENTS

| | | | | |
|---|---|---|---|---|
| JP | 2006-256709 | A | | 9/2006 |
| JP | 2018-2315 | A | | 1/2018 |
| JP | 2021-38096 | A | | 3/2021 |
| JP | 2021-54602 | A | | 4/2021 |
| JP | 2021-54614 | A | | 4/2021 |
| JP | 2021054602 | A | * | 4/2021 |

* cited by examiner

IMAGE RECORDING APPARATUS

REFERENCE TO RELATED APPLICATIONS

This application claims priorities from Japanese Patent Application Nos. 2022-028407 filed on Feb. 25, 2022, 2022-028371 filed on Feb. 25, 2022, 2022-028343 filed on Feb. 25, 2022, and 2023-023280 filed on Feb. 17, 2023. The entire contents of the priority applications are incorporated herein by reference.

BACKGROUND ART

A printer (image recording apparatus) has been known that includes a first paper feed tray (first tray) and a second paper feed tray (second tray) overlapping the first paper feed tray in an up-down direction (first direction). In this configuration, a first paper feed roller (first roller) provided for the first paper feed tray and a second paper feed roller (second roller) provided for the second paper feed tray are located at the same position in a front-rear direction (second direction). An oblique wall portion extending in an oblique direction (third direction) intersecting both the up-down direction and the front-rear direction is disposed at a rear side of each paper feed roller.

A configuration has been known in which a pair of side plates (side walls) and a side guide disposed at an inner side of the pair of side plates are provided in a paper feed tray of a printer unit (image recording apparatus).

A recording apparatus (image recording apparatus) has been known in which a stopper member (stopper) is provided at a bottom portion of a guide member (separating member). In this configuration, the stopper member may be switched between a regulation state in which the stopper member comes into contact with a leading end of a medium accommodated in a tray to regulate movement of the medium and a regulation release state in which the regulation state is released and the medium accommodated in the tray may advance to a downstream side in a conveyance direction along a guide slope of the guide member.

DESCRIPTION

When forms of a sheet medium accommodated in the first tray and the second tray are different from each other, for example, when the maximum accommodation numbers of sheet media in the first tray and the second tray are different from each other, various problems may occur.

An object of the present invention is to provide an image recording apparatus capable of preventing various problems that may occur when two trays are provided.

When the forms of the sheet medium accommodated in the first tray and the second tray are different from each other, for example, when lengths of the sheet media that may be supported in the first tray and the second tray are different from each other, various problems may occur in designing the side guide for the first tray and the second tray.

Another object of the present invention is to provide an image recording apparatus capable of preventing various problems that may occur when a side guide is provided for two trays.

With the separating member and the stopper, multi-feed (a phenomenon in which a plurality of media are conveyed in an overlapped state) may be avoided. However, in the image recording apparatus including the first tray and the second tray, when the maximum accommodation numbers of sheet media in the first tray and the second tray are different from each other, various problems may occur. For example, in a tray having a smaller maximum accommodation number among the first tray and the second tray, a configuration of a multi-feed prevention mechanism (the separating member and the stopper) is excessive, which may cause an increase in cost and a degradation in a feeding function. In addition, in a tray having a larger maximum accommodation number among the first tray and the second tray, the configuration of the multi-feed prevention mechanism is insufficient, and a multi-feed prevention function may be degraded.

Another object of the present invention is to provide an image recording apparatus capable of preventing various problems that may occur when a multi-feed prevention mechanism is provided for two trays having different maximum accommodation numbers.

According to a first aspect of the present invention, there is provided an image recording apparatus including: a first tray; a second tray overlapping the first tray in a first direction; a first roller that is capable of feeding a sheet medium accommodated in the first tray from an upstream side to a downstream side in a second direction intersecting the first direction; a second roller that is capable of feeding the sheet medium accommodated in the second tray from an upstream side to a downstream side in the second direction; a first separating member that is disposed at a downstream side in the second direction with respect to the first roller and extends in a third direction intersecting both the first direction and the second direction, and that comes into contact with the sheet medium fed from the first tray by the first roller to separate the sheet medium coming into contact with the first roller from another sheet medium; a second separating member that is disposed at a downstream side in the second direction with respect to the second roller and extends in the third direction, and that comes into contact with the sheet medium fed from the second tray by the second roller to separate the sheet medium coming into contact with the second roller from another sheet medium; and a recording unit that records an image on the sheet medium fed by the first roller or the second roller. A length of the second separating member in the third direction is longer than a length of the first separating member in the third direction. The second roller is positioned at an upstream side of the first roller in the second direction in a state where no sheet medium is accommodated in the first tray or the second tray.

According to a second aspect of the present invention, there is provided an image recording apparatus including: a first tray; a second tray overlapping the first tray in a first direction; a first roller that is capable of feeding a sheet medium accommodated in the first tray from an upstream side to a downstream side in a second direction intersecting the first direction; a second roller that is capable of feeding the sheet medium accommodated in the second tray from an upstream side to a downstream side in the second direction; a first arm that has one end supporting the first roller and another end and is rotatable with the other end serving as a fulcrum; a second arm that has one end supporting the second roller and another end and is rotatable with the other end serving as a fulcrum; and a recording unit that records an image on the sheet medium fed by the first roller or the second roller. The second tray is capable of accommodating a roll body in which a sheet medium is wound in a roll shape. A length from the other end of the first arm to a position where the first roller contacts the sheet medium is different from a length from the other end of the second arm to a position where the second roller contacts the sheet medium.

According to a third aspect of the present invention, there is provided an image recording apparatus including: a tray having a support surface; a feeding mechanism that is capable of feeding a sheet medium supported on the support surface in a first direction along the support surface; and a recording unit that records an image on the sheet medium fed by the feeding mechanism. The tray includes a pair of side walls that sandwich the sheet medium supported on the support surface in a second direction, the second direction being orthogonal to the first direction and along the support surface, and a side guide that is disposed at an inner side of the pair of side walls and is able to contact an end in the second direction of the sheet medium supported on the support surface. The tray includes a first tray and a second tray. A length of the side guide of the first tray in the first direction and a length of the side guide of the second tray in the first direction are different from each other.

According to a fourth aspect of the present invention, there is provided an image recording apparatus including: a tray having a support surface; a feeding mechanism that is capable of feeding a sheet medium supported on the support surface in a first direction along the support surface; and a recording unit that records an image on the sheet medium fed by the feeding mechanism. The tray includes a pair of side walls that sandwich the sheet medium supported on the support surface in a second direction, the second direction being orthogonal to the first direction and along the support surface, and a side guide that is disposed at an inner side of the pair of side walls and is able to contact an end in the second direction of the sheet medium supported on the support surface. The tray includes a first tray and a second tray. The first tray is capable of supporting a plurality of sheet media in a stacked state. The second tray is capable of supporting a roll body in which a sheet medium is wound in a roll shape. The side guide of the first tray and the side guide of the second tray are different from each other in at least one of a length in the first direction, a length in the second direction, and a length in a third direction orthogonal to the support surface.

According to a fifth aspect of the present invention, there is provided an image recording apparatus including: a housing; a tray that has a support surface for supporting a plurality of sheet media in a stacked state, is movable in a first direction with respect to the housing, and is able to take an attached position where the tray is attached to the housing and a drawn-out position at an upstream side of the attached position in the first direction; a feeding mechanism that is capable of feeding the sheet medium supported on the support surface from an upstream side toward a downstream side in the first direction; a recording unit that records an image on the sheet medium fed by the feeding mechanism; a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media; and a stopper that is able to take an advanced position where the stopper is advanced to a conveyance path of the sheet medium along the separating member and a retreated position where the stopper is retreated from the conveyance path, and that moves from the advanced position to the retreated position when the tray moves from the drawn-out position to the attached position. The tray includes a first tray and a second tray. The separating member includes a first separating member corresponding to the first tray and a second separating member corresponding to the second tray. A length of the second separating member in the third direction is longer than a length of the first separating member in the third direction. The stopper is provided for at least one of the first tray and the second tray, and the number of stoppers corresponding to the second tray is larger than the number of stoppers corresponding to the first tray.

According to a sixth aspect of the present invention, there is provided an image recording apparatus including: a housing; a tray that has a support surface for supporting a plurality of sheet media in a stacked state, is movable in a first direction with respect to the housing, and is able to take an attached position where the tray is attached to the housing and a drawn-out position at an upstream side of the attached position in the first direction; a feeding mechanism that is capable of feeding the sheet medium supported on the support surface from an upstream side toward a downstream side in the first direction; a recording unit that records an image on the sheet medium fed by the feeding mechanism; a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media; and a stopper that is able to take an advanced position where the stopper is advanced to a conveyance path of the sheet medium along the separating member and a retreated position where the stopper is retreated from the conveyance path, and that moves from the advanced position to the retreated position when the tray moves from the drawn-out position to the attached position. The tray includes a first tray and a second tray. The separating member includes a first separating member corresponding to the first tray and a second separating member corresponding to the second tray. A length of the second separating member in the third direction is longer than a length of the first separating member in the third direction. The stopper includes a first stopper corresponding to the first tray and a second stopper corresponding to the second tray, and an advancing amount of the second stopper to the conveyance path in the advanced position is larger than an advancing amount of the first stopper.

According to a seventh aspect of the present invention, there is provided an image recording apparatus including: a tray having a support surface for supporting a plurality of sheet media in a stacked state; a feeding mechanism that is capable of feeding the sheet medium supported on the support surface from an upstream side toward a downstream side in a first direction along the support surface; a recording unit that records an image on the sheet medium fed by the feeding mechanism; and a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media. The tray includes a first tray and a second tray. The feeding mechanism includes a first feeding mechanism corresponding to the first tray and a second feeding mechanism corresponding to the second tray. The separating member includes a first separating member corresponding to the first tray and a second separating member corresponding to the second tray. A length of the second separating member in the third direction is longer than a length of the first separating member in the third direction. The first separating member is fixed, and the second separating member is movable to the downstream side in the first direction against an urging force of an urging member when coming into contact with the sheet medium fed by the second feeding mechanism.

According to an eighth aspect of the present invention, there is provided an image recording apparatus including: a tray having a support surface for supporting a plurality of sheet media in a stacked state; a feeding mechanism that is capable of feeding the sheet medium supported on the support surface from an upstream side toward a downstream side in a first direction along the support surface; a recording unit that records an image on the sheet medium fed by the feeding mechanism; and a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media. The tray includes a first tray and a second tray. The feeding mechanism includes a first feeding mechanism corresponding to the first tray and a second feeding mechanism corresponding to the second tray. The separating member includes a first separating member corresponding to the first tray and a second separating member corresponding to the second tray. A length of the second separating member in the third direction is longer than a length of the first separating member in the third direction. The first separating member is slidable in the first direction, and slides so as to move to the downstream side in the first direction against an urging force of a first urging member when coming into contact with the sheet medium fed by the first feeding mechanism. The second separating member includes one end provided with a rotation shaft extending along a fourth direction orthogonal to both the first direction and the second direction, and another end opposite to the one end, and is rotatable about the rotation shaft, and when the second separating member comes into contact with the sheet medium fed by the second feeding mechanism, the second separating member rotates about the rotation shaft such that the other end moves to the downstream side in the first direction against an urging force of a second urging member.

According to a ninth aspect of the present invention, there is provided an image recording apparatus including: a tray having a support surface for supporting a plurality of sheet media in a stacked state; a feeding mechanism that is capable of feeding the sheet medium supported on the support surface from an upstream side toward a downstream side in a first direction along the support surface; a recording unit that records an image on the sheet medium fed by the feeding mechanism; and a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media. The tray includes a first tray and a second tray. The feeding mechanism includes a first feeding mechanism corresponding to the first tray and a second feeding mechanism corresponding to the second tray. The separating member includes a first separating member corresponding to the first tray and a second separating member corresponding to the second tray. A length of the second separating member in the third direction is longer than a length of the first separating member in the third direction. The first separating member is movable to the downstream side in the first direction against an urging force of a first urging member when coming into contact with the sheet medium fed by the first feeding mechanism. The second separating member is movable to the downstream side in the first direction against an urging force of a second urging member when coming into contact with the sheet medium fed by the second feeding mechanism. The urging force of the second urging member is larger than the urging force of the first urging member.

According to a tenth aspect of the present invention, there is provided an image recording apparatus including: a tray having a support surface for supporting a plurality of sheet media in a stacked state; a feeding mechanism that is capable of feeding the sheet medium supported on the support surface from an upstream side toward a downstream side in a first direction along the support surface; a recording unit that records an image on the sheet medium fed by the feeding mechanism; a separating member that is disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media; and uneven portion that is provided in a region extending in the third direction on a front surface of the separating member with which the sheet medium comes into contact, the uneven portion being formed of an unevenness repeated along the third direction. The tray includes a first tray and a second tray. The separating member includes a first separating member corresponding to the first tray and a second separating member corresponding to the second tray. A length of the second separating member in the third direction is longer than a length of the first separating member in the third direction. The uneven portion is provided for at least one of the first separating member and the second separating member, and the number of uneven portions corresponding to the second separating member is larger than the number of uneven portions corresponding to the first separating member.

According to the first aspect of the present invention, the second separating member may have a longer length in the third direction than the first separating member, and the second tray may have a larger maximum accommodation number than the first tray. In this configuration, the second roller is positioned at the upstream side of the first roller in the second direction in a state where no sheet medium is stored in the first tray or the second tray. In this case, for example, when an interval between the first roller and the first separating member in the second direction and an interval between the second roller and the second separating member in the second direction are set to be equal to each other in order to prevent an increase in variation in performance of separating the sheet medium in the first tray and the second tray, an upstream end of the second separating member in the second direction may be disposed at the upstream side in the second direction with respect to an upstream end of the first separating member in the second direction, compared to a case where the second roller is located at the same position in the second direction as the first roller or a case where the second roller is located at the downstream side of the first roller in the second direction. Accordingly, it is possible to prevent an increase in size of the image recording apparatus in the second direction.

According to the second aspect of the present invention, since the second tray may accommodate the roll body, a length of the second tray in the first direction may be longer than a length of the first tray in the first direction (that is, the maximum accommodation number of the second tray may be larger than that of the first tray). In this configuration, the length from the other end of the arm to the position where the roller contacts the sheet medium is different in the first tray and the second tray. In this case, unlike a case where the length is the same in the first tray and the second tray, influence of a force in a gravity direction generated by weights of the arm and the roller that acts on the sheet medium may be alleviated by the length, and a defect in paper feeding may be prevented from occurring.

According to the third aspect of the present invention, since the lengths of the side guides in the first direction in the first tray and the second tray are made different from each other, it is possible to prevent occurrences of various problems such as a degradation in a guide function of the side guides when forms of the sheet medium supported in the first tray and the second tray (lengths of the sheet medium in the first direction and the like) are different from each other.

According to the fourth aspect of the present invention, since the side guide of the first tray and the side guide of the second tray are made different from each other in at least one of the length in the first direction, the length in the second direction, and the length in the third direction, it is possible to prevent occurrences of various problems such as a degradation in a guide function of the side guide when forms of the sheet medium supported in the first tray and the second tray (cut paper, rolled paper, or the like) are different from each other.

According to the fifth aspect of the present invention, since the length of the second separating member in the third direction is longer than that of the first separating member, the second tray has a larger maximum accommodation number than the first tray. With this configuration, since the number of stoppers in the tray (first tray) having a small maximum accommodation number is reduced, it is possible to prevent an increase in cost and a degradation in a feeding function. In addition, since the number of stoppers in the tray (second tray) having a large maximum accommodation number is increased, it is possible to prevent a degradation in a multi-feed prevention function.

According to the sixth aspect of the present invention, since the length of the second separating member in the third direction is longer than that of the first separating member, the second tray has a larger maximum accommodation number than the first tray. With this configuration, since the advancing amount of the stopper is reduced in the tray (first tray) having a small maximum accommodation number, a degradation in a feeding function may be avoided. In addition, since the advancing amount of the stopper in the tray (second tray) having a large maximum accommodation number is increased, a degradation in a multi-feed prevention function may be avoided.

According to the seventh aspect of the present invention, in the configuration in which the separating member is fixed, resistance applied to the sheet medium by the separating member is constant regardless of the accommodation number of the sheet medium. In this case, for example, when about a half of the maximum number of sheet media are accommodated in the tray, the plurality of sheet media conveyed in an overlapped state are separated by the resistance, and multi-feed may be avoided. However, when the maximum number of sheet media are accommodated in the tray or when the minimum number of sheet media are accommodated therein, the plurality of sheet media conveyed in an overlapped state may be unable to be separated by the resistance, and it may be unable to prevent the multi-feed. On the other hand, in the configuration in which the separating member moves against the urging force, the resistance applied to the sheet medium changes according to the accommodation number of the sheet media, and the multi-feed may be avoided by the resistance. Therefore, in the seventh aspect of the present invention, the separating member is fixed to the tray (first tray) having a small maximum accommodation number, and thus complication of the mechanism may be avoided and an increase in cost may be avoided. In addition, with the configuration in which the separating member moves in the tray (second tray) having a large maximum accommodation number, a degradation in a multi-feed prevention function may be avoided.

In the eighth aspect of the present invention, it is assumed that a position in the second direction of a force from the sheet medium that acts on the separating member changes in a process from a state where the maximum number of sheet media are accommodated in the tray to a state in which the minimum number of sheet media are accommodated therein. In this case, in the configuration in which the separating member slides, when the maximum accommodation number is large, a change in the position of the force in the second direction is large in the process from the state where the maximum number of sheet media are accommodated in the tray to the state where the minimum number of sheet media are accommodated in the tray. Therefore, it may be unable to prevent multi-feed. For example, when about a half of the maximum number of sheet media are accommodated in the tray, the separating member slides by the force, and the multi-feed may be avoided. However, when the maximum number of sheet media are accommodated in the tray or when the minimum number of sheet media are accommodated therein, the separating member may not slide by the force, or a sliding amount is small even if the separating member slides by the force, and it may be unable to prevent the multi-feed. On the other hand, in the configuration in which the separating member rotates, even if the force changes in the second direction, the separating member rotates and the multi-feed may be avoided. Therefore, in the present configuration, the separating member slides in the tray (first tray) having a small maximum accommodation number, and thus it is possible to avoid complication of the mechanism and prevent an increase in cost. In addition, with the configuration in which the separating member rotates in the tray (second tray) having a large maximum accommodation number, a degradation in a multi-feed prevention function may be avoided.

According to the ninth aspect of the present invention, since the length of the second separating member in the third direction is longer than that of the first separating member, the second tray has a larger maximum accommodation number than the first tray. With this configuration, since the urging force of the urging member is reduced in the tray (first tray) having a small maximum accommodation number, it is possible to prevent an increase in cost and a degradation in a feeding function. In addition, since the urging force of the urging member is increased in the tray (second tray) having a large maximum accommodation number, it is possible to prevent a degradation in a multi-feed prevention function.

According to the tenth aspect of the present invention, since the length of the second separating member in the third direction is longer than that of the first separating member, the second tray has a larger maximum accommodation number than the first tray. With this configuration, since the number of uneven portions in the tray (first tray) having a small maximum accommodation number is reduced, it is possible to prevent an increase in cost and a degradation in a feeding function. In addition, since the number of uneven portions in the tray (second tray) having a large maximum accommodation number is increased, it is possible to prevent a degradation in a multi-feed prevention function.

OVERALL CONFIGURATION OF PRINTER

Figure 1:
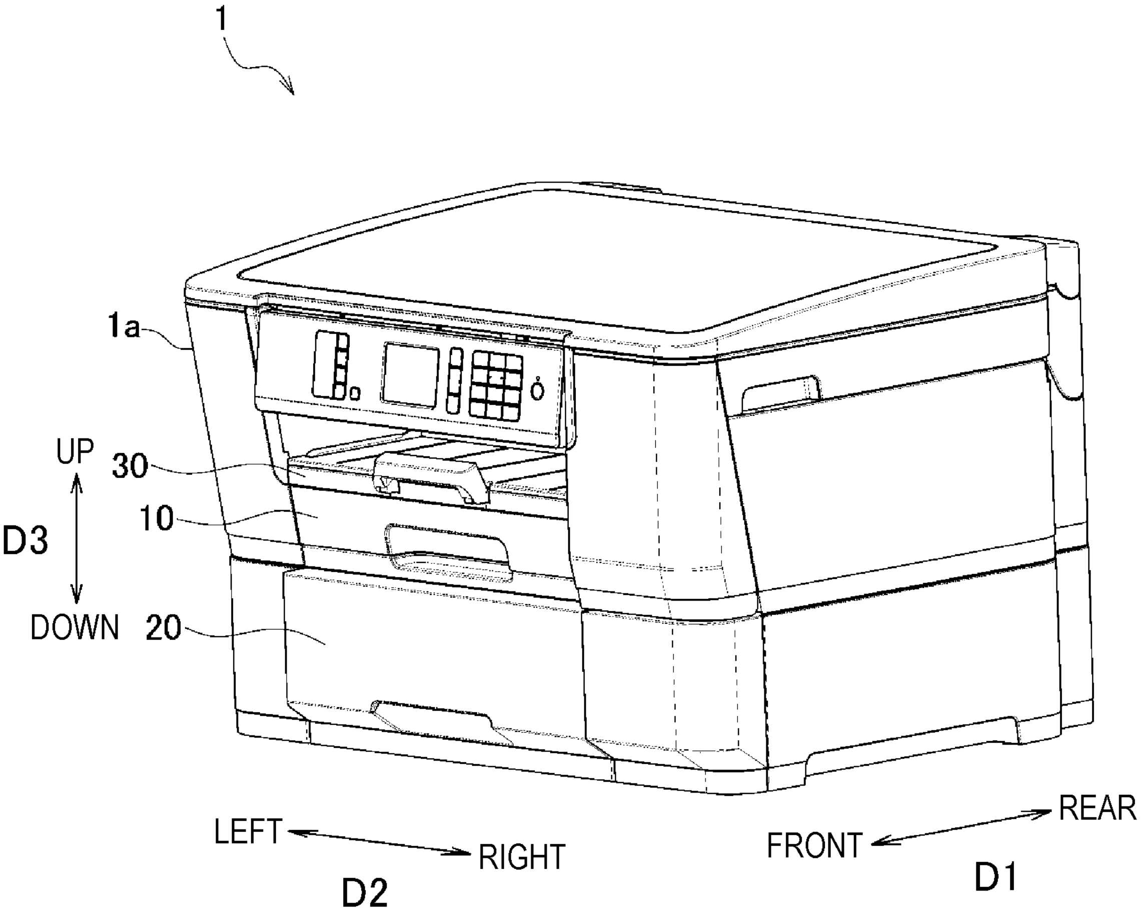
FIG. 1 is a perspective view of a printer according to the present invention.

As illustrated in FIG. 1, a printer 1 (image recording apparatus) according to an embodiment of the present invention includes a housing 1*a*, paper feed trays 10 and 20 that are attachable to and detachable from the housing 1*a*, and a paper discharge tray 30. The paper feed tray 10 corresponds to a "first tray" of the present invention, and the paper feed tray 20 corresponds to a "second tray" of the present invention.

In a state where the paper feed trays 10 and 20 are attached to the housing 1*a*, the paper feed tray 20 overlaps the paper feed tray 10 in an up-down direction D3 (first direction) and is disposed below the paper feed tray 10. The paper feed trays 10 and 20 each have a box shape opening to an upper side, and are attachable to and detachable from the housing 1*a* in a front-rear direction D1 (second direction). The paper feed trays 10 and 20 are pulled out from the housing 1*a* by being moved forward with respect to the housing 1*a*, and are attached to the housing 1*a* by being moved rearward with respect to the housing 1*a*.

Widths (lengths in a left-right direction D2) of the paper feed trays 10 and 20 and the paper discharge tray 30 are substantially the same as each other. A height of the paper feed tray 20 (length in the up-down direction D3) is larger than a height of the paper feed tray 10.

Figure 2:
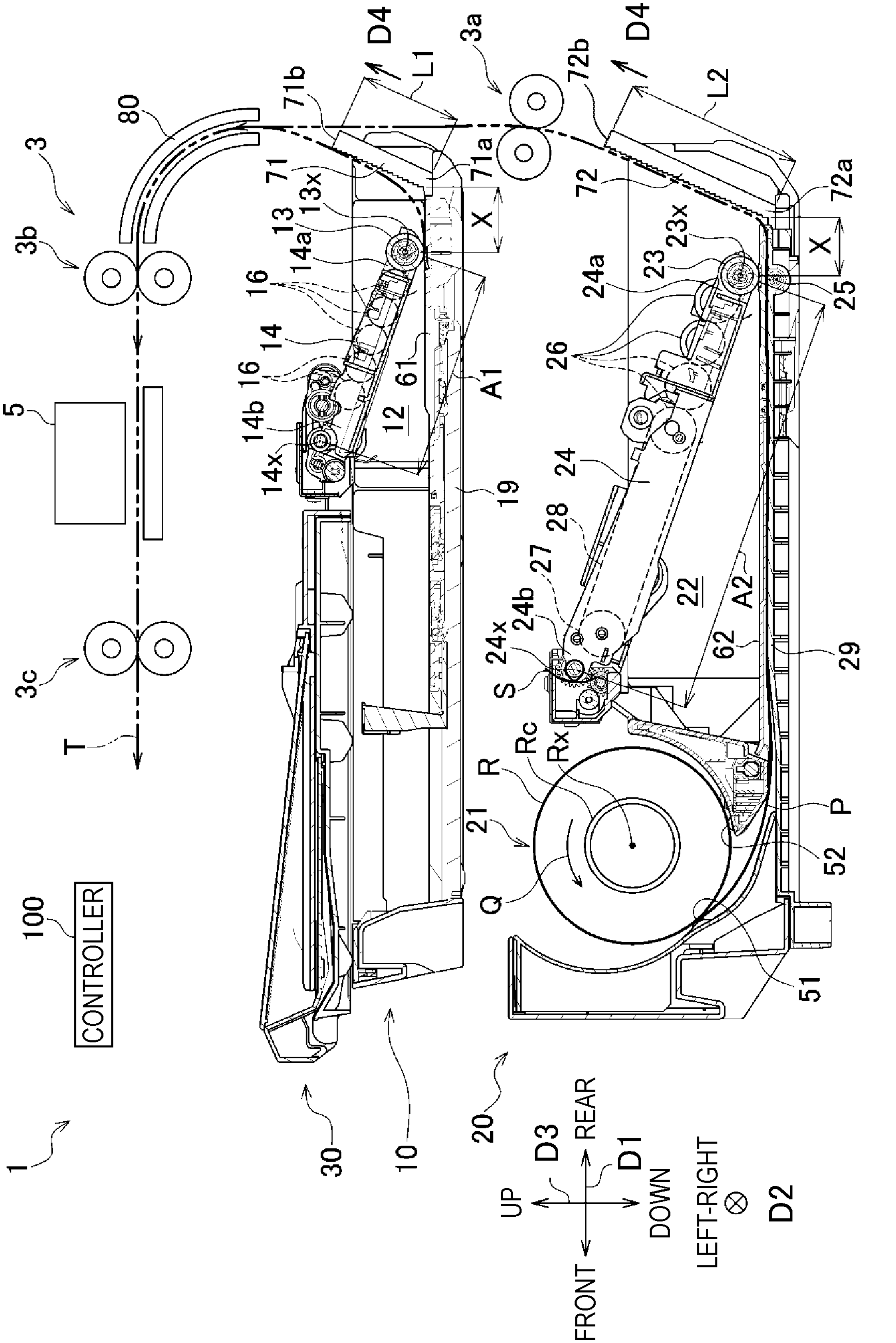
FIG. 2 is a schematic side view illustrating an internal structure of the printer in FIG. 1.
Figure 3:
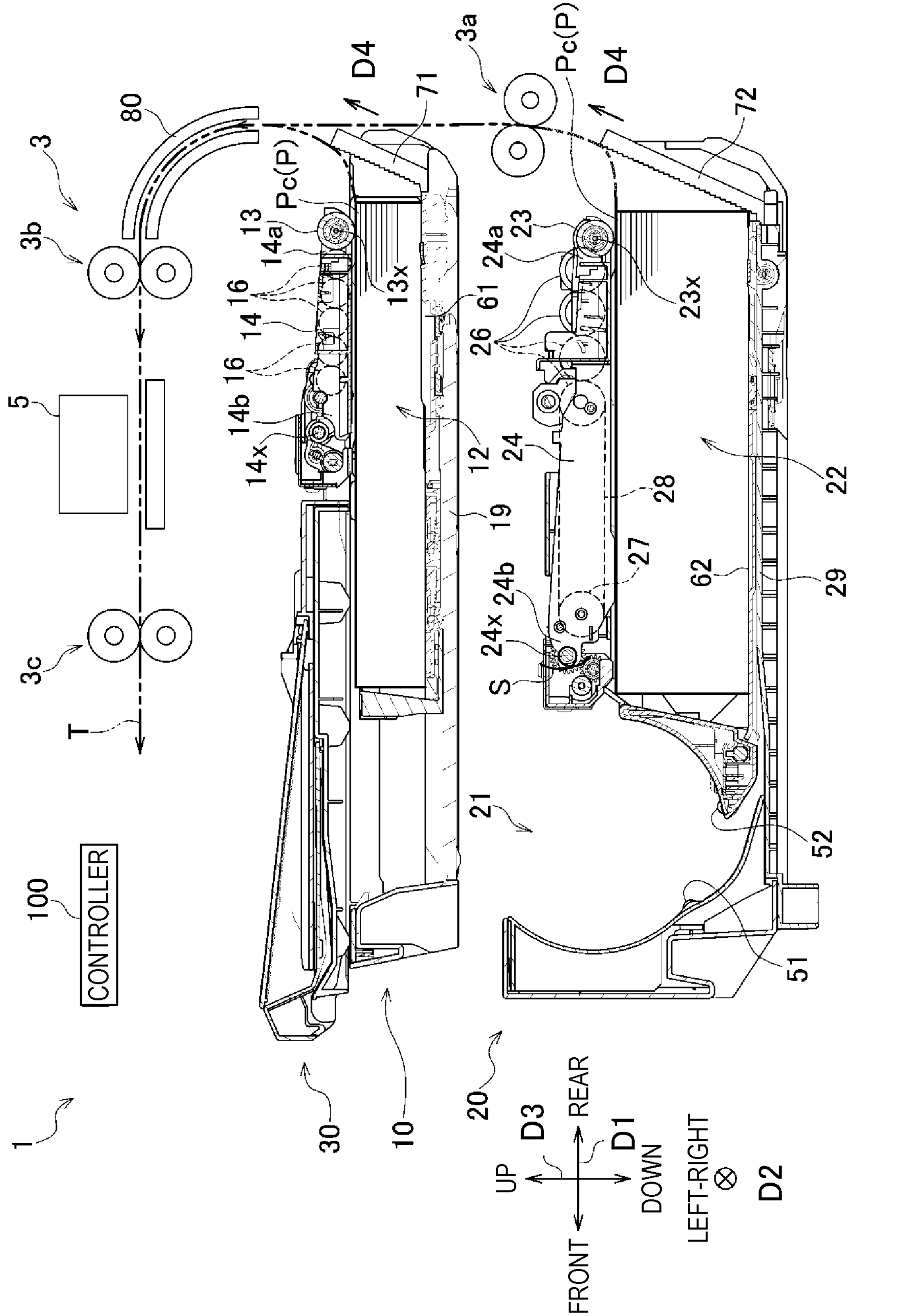
FIG. 3 is a schematic side view corresponding to FIG. 2, illustrating a state where a maximum number of sheets of cut paper are accommodated in each paper feed tray in the printer in FIG. 1.

As illustrated in FIGS. 2 and 3, the printer 1 further includes a conveying mechanism 3, a head 5, and a control unit 100. Elements of the conveying mechanism 3 other than rollers 51 and 52, which will be described later, the head 5, and the control unit 100 are supported by the housing 1*a*.

The conveying mechanism 3 is configured to selectively convey paper P from the paper feed trays 10 and 20, and includes the rollers 51 and 52, rollers 13 and 23, arms 14 and 24, roller pairs 3*a* to 3*c*, separating members 71 and 72, a pair of guide members 80, and a conveyance motor (not illustrated) for driving the rollers. The paper P in each of the paper feed trays 10 and 20 is conveyed by the conveying mechanism 3 along a conveyance path T that passes between the pair of guide members 80, below the head 5, and toward the paper discharge tray 30.

The paper P is a general term of the paper P unwound from rolled paper R described later and cut paper Pc, and corresponds to a "sheet medium" of the present invention. The cut paper Pc is paper P having a shorter length along the conveyance path T than the paper P constituting the rolled paper R.

The paper feed tray 10 includes a cut paper accommodating portion 12 capable of accommodating a plurality of sheets of cut paper Pc (see FIG. 3) stacked in the up-down direction D3. The cut paper Pc accommodated in the cut paper accommodating portion 12 is supported on an upper surface of a support plate 61 disposed along a bottom plate 19 of the paper feed tray 10.

The roller 13 (corresponding to a "first roller" of the present invention) is supported by one end 14*a* of the arm 14 (corresponding to a "first arm" of the present invention) and is rotatable about a shaft 13*x* extending along the left-right direction D2. The other end 14*b* of the arm 14 is supported by the housing 1*a* (see FIG. 1) via a shaft 14*x* extending in the left-right direction D2. The arm 14 is rotatable about the shaft 14*x* with the other end 14*b* serving as a fulcrum (see FIGS. 2 and 3).

Five gears 16 (corresponding to a "first gear" of the present invention), which serve as a mechanism for transmitting a driving force of the conveyance motor to the roller 13, are attached to the arm 14. The five gears 16 are arranged from the other end 14*b* toward the one end 14*a* of the arm 14 and are coupled to each other. Among the five gears 16, the gear 16 closest to the one end 14*a* of the arm 14 is coupled to the roller 13.

When no cut paper Pc is accommodated in the cut paper accommodating portion 12 in a state where the paper feed tray 10 is attached to the housing 1*a*, the roller 13 comes into contact with the upper surface of the support plate 61 (see FIG. 2). When the cut paper Pc is accommodated in the cut paper accommodating portion 12 in a state where the paper feed tray 10 is attached to the housing 1*a*, the roller 13 comes into contact with the uppermost sheet of the cut paper Pc accommodated in the cut paper accommodating portion 12 (see FIG. 3). At this time, the conveyance motor performs driving under control of the control unit 100, and the roller 13 is rotated by the driving force transmitted via the five gears 16. Accordingly, the cut paper Pc is fed from the front (upstream side) to the rear (downstream side) in the front-rear direction D1.

The cut paper Pc fed from the paper feed tray 10 by the roller 13 comes into contact with the separating member 71, moves along the separating member 71, and is guided to between the pair of guide members 80.

The separating member 71 (corresponding to a "first separating member" of the present invention) is disposed at a rear side (downstream side in the front-rear direction D1) of the roller 13. The separating member 71 extends in an oblique direction D4 (a third direction) intersecting both the up-down direction D3 and the front-rear direction D1. In other words, the separating member 71 is inclined so as to be positioned higher while going toward the rear side. On a front surface of the separating member 71 defining the conveyance path T, a fine unevenness is formed repeatedly along the conveyance path T. With the unevenness, multi-feed (a phenomenon where a plurality of sheets of cut paper Pc are conveyed in an overlapped state) is prevented. That is, the separating member 71 has a function of separating the cut paper Pc contacting the roller 13 from the other sheets of cut paper Pc.

The paper feed tray 20 includes a rolled paper accommodating portion 21 capable of accommodating the rolled paper R (see FIG. 2), and a cut paper accommodating portion 22 capable of accommodating a plurality of sheets of cut paper Pc (see FIG. 3) stacked in the up-down direction D3. The cut paper Pc accommodated in the cut paper accommodating portion 22 is supported on an upper surface of a support plate 62 disposed along a bottom plate 29 of the paper feed tray 20.

In the paper feed tray 20, when the rolled paper R is used, the cut paper Pc is removed from the cut paper accommodating portion 22 (see FIG. 2), and when the cut paper Pc is used, the rolled paper R is removed from the rolled paper accommodating portion 21 (see FIG. 3). The cut paper accommodating portion 22 is a space behind the rolled paper accommodating portion 21.

The number of sheets of cut paper Pc that may be accommodated in the cut paper accommodating portion 22 is larger than the number of sheets of cut paper Pc that may be accommodated in the cut paper accommodating portion 12.

The roller 23 (corresponding to a "second roller" of the present invention) is supported by one end 24*a* of the arm 24 (corresponding to a "second arm" of the present invention) and is rotatable about a shaft 23*x* extending along the left-right direction D2. The other end 24*b* of the arm 24 is supported by the housing 1*a* (see FIG. 1) via a shaft 24*x* extending along the left-right direction D2. The arm 24 is rotatable about the shaft 24*x* with the other end 24*b* serving as a fulcrum (see FIGS. 2 and 3).

As a mechanism for transmitting a driving force of the conveyance motor to the roller 23, four gears 26 (corresponding to a "second gear" of the present invention), a pulley 27, and a transmission belt 28 are attached to the arm 24. The four gears 26 are arranged, at an one end 24*a* side of the arm 24, from the other end 24*b* toward the one end 24*a*, and are coupled to each other. Among the four gears 26, the gear 26 closest to the one end 24*a* of the arm 24 is coupled to the roller 23. The pulley 27 is disposed in the vicinity of the other end 24*b* of the arm 24, and rotates with the driving of the conveyance motor. The transmission belt 28 is wound around the pulley 27 and one of the four gears 26 (the gear 26 closest to the other end 24*b*). When the pulley 27 rotates, the transmission belt 28 travels, and a rotational force of the pulley is transmitted to the one gear 26 and transmitted to the roller 23 via the remaining gears 26.

A coil spring S is wound around the shaft 24*x*. The coil spring S corresponds to a "urging member" of the present invention, and urges the arm 24 in a direction in which the roller 23 separates from the upper surface (medium support surface) of the support plate 62 of the paper feed tray 20 (in a direction in which the roller 23 moves upward). In FIG. 2, the arm 24 is urged by the coil spring S in a direction of rotating counterclockwise.

When no cut paper Pc is accommodated in the cut paper accommodating portion 22 in a state where the paper feed tray 20 is attached to the housing 1*a*, the roller 23 comes into contact with the upper surface of the support plate 62 (see FIG. 2). When the cut paper Pc is accommodated in the cut paper accommodating portion 22 in a state where the paper feed tray 20 is attached to the housing 1*a*, the roller 23 comes into contact with the uppermost sheet of the cut paper Pc accommodated in the cut paper accommodating portion 22 (see FIG. 3). At this time, the conveyance motor performs driving under the control of the control unit 100, and the roller 23 is rotated by the driving force transmitted via the pulley 27, the transmission belt 28, and the four gears 26. Accordingly, the cut paper Pc is fed from the front (upstream side) to the rear (downstream side) in the front-rear direction D1.

The rolled paper R is obtained by winding a long sheet of paper P in a roll shape around an outer circumferential surface of a cylindrical core member Rc, and corresponds to a "roll body" of the present invention. The rolled paper R is accommodated in the rolled paper accommodating portion 21 in a state where a rotation axis Rx (a center axis of the core member Rc) is along the left-right direction D2.

The rollers 51 and 52 are disposed at a bottom portion of the rolled paper accommodating portion 21. The rollers 51 and 52 are rotatable about an axis extending in the left-right direction D2. When the rolled paper R is accommodated in the rolled paper accommodating portion 21, an outer circumferential surface of a lower portion of the rolled paper R is supported by the rollers 51 and 52. When setting the rolled paper R, the rolled paper R is manually rotated in an arrow direction Q in FIG. 2, and the paper P is unrolled from the rolled paper R. The paper P is passed through a gap between a lower surface of the support plate 62 and an upper surface of the bottom plate 29, and a leading end of the paper P is sandwiched between the roller 23 and a roller 25. In this state, the conveyance motor performs driving under the control of the control unit 100 to rotate the rollers 51, 52, and 23, whereby the paper P unwound from the rolled paper R is fed from the front (upstream side) toward the rear (downstream side) in the front-rear direction D1.

The paper P fed by the roller 23 from the paper feed tray 20 (the paper P unwound from the rolled paper R accommodated in the rolled paper accommodating portion 21, or the cut paper Pc accommodated in the cut paper accommodating portion 22) comes into contact with the separating member 72, moves along the separating member 72, and is guided to the roller pair 3*a*.

The separating member 72 (corresponding to a "second separating member" of the present invention) is disposed at a rear side (downstream side in the front-rear direction D1) of the roller 23. Similar to the separating member 71, the separating member 72 extends in the oblique direction D4. In other words, the separating member 72 is inclined so as to be positioned higher while going toward the rear side. On a front surface of the separating member 72 defining the conveyance path T, a fine unevenness is formed repeatedly along the conveyance path T. With the unevenness, multi-feed (a phenomenon where a plurality of sheets of cut paper Pc are conveyed in an overlapped state) is prevented. That is, the separating member 72 has a function of separating the cut paper Pc contacting the roller 23 from the other sheets of cut paper Pc.

The head 5 (corresponding to a "recording unit" of the present invention) includes a plurality of nozzles (not illustrated) formed on a lower surface thereof and a driver IC. When the paper P conveyed by the conveying mechanism 3 passes through a position facing the lower surface of the head 5, the driver IC is driven under the control of the control unit 100. Accordingly, ink is ejected from the nozzles and lands on the paper P, and an image is recorded on the paper P. The head 5 may be of a line type that ejects ink from the nozzles in a state where a position thereof is fixed, or a serial type that ejects ink from the nozzles while moving in the left-right direction D2.

The control unit 100 is connected to the conveyance motor and the driver IC via an internal bus (not illustrated). The control unit 100 includes a central processing unit (CPU), a read only memory (ROM), and a random access memory (RAM). The ROM stores a program and data for the CPU to perform various type of control. The RAM temporarily stores data used when the CPU executes the program.

Configuration and Effects of the Present Embodiment

In the above-described configuration, a length L2 of the separating member 72 in the oblique direction D4 is longer than a length L1 of the separating member 71 in the oblique direction D4 (see FIG. 2). In this case, the maximum accommodation number of the cut paper Pc in the paper feed tray 20 may be larger than that in the paper feed tray 10. In this configuration, in a state where no cut paper Pc is accommodated in the paper feed trays 10 and 20, the roller 23 is positioned at a front side of the roller 13 (at the upstream side in the front-rear direction D1). In this case, for example, in order to prevent an increase in variation in performance of separating the cut paper Pc between the paper feed tray 10 and the paper feed tray 20, when an interval X in the front-rear direction D1 between the roller 13 and a front end 71*a* of the separating member 71 (the upstream end in the front-rear direction D1) and an interval X in the front-rear direction D1 between the roller 23 and a front end 72*a* of the separating member 72 are set to be equal to each other, the front end 72*a* of the separating member 72 may be disposed at a front side of the front end 71*a* of the separating member 71 (at the upstream side in the front-rear direction D1), as compared with a case where the roller 23 is at the same position in the front-rear direction D1 as the roller 13 or a case where the roller 23 is positioned at a rear side of the roller 13 (at the downstream side in the front-rear direction D1). Accordingly, it is possible to prevent an increase in size of the printer 1 in the front-rear direction D1.

A rear end 72*b* (a downstream end in the front-rear direction D1) of the separating member 72 is at the same position in the front-rear direction D1 as a rear end 71*b* of the separating member 71. That is, the separating member 72 does not protrude rearward from the separating member 71. Accordingly, it is possible to more reliably prevent an increase in size of the printer 1 in the front-rear direction D1.

A length A2 from the other end 24*b* of the arm 24 to a position where the roller 23 contacts the paper P is longer than a length A1 from the other end 14*b* of the arm 14 to a position where the roller 13 contacts the paper P (see FIG. 2). When the length is short in a tray having a large maximum accommodation number of the cut paper Pc, an angular change of the arm from a state where the maximum number of sheets of cut paper Pc are accommodated in the tray (see FIG. 3) to a state where there is no cut paper Pc in the tray (see FIG. 2) is large. Accordingly, a change in force in a gravity direction generated by weights of the arm and the roller that acts on the cut paper Pc increases with a decrease in the accommodation number of the cut paper Pc, and a defect in paper feeding occurs. In this regard, in the present embodiment, since the length A2 is long in the paper feed tray 20 in which the maximum accommodation number of the cut paper Pc is large, the angular change of the arm 24 from the state where the maximum number of sheets of cut paper Pc are accommodated in the paper feed tray 20 (see FIG. 3) to the state where there is no cut paper Pc in the paper feed tray 20 (see FIG. 2) is small. Accordingly, it is possible to prevent the force in the gravity direction generated by the weights of the arm and the roller that acts on the cut paper Pc from changing with a decrease in the accommodation number of the cut paper Pc, and to prevent a defect in paper feeding. from occurring.

A length from the other end 24*b* to the one end 24*a* of the arm 24 is longer than a length from the other end 14*b* to the one end 14*a* of the arm 14 (see FIG. 2). In order to make the lengths A1 and A2 different, it is conceivable to make diameters of the rollers 13 and 23 different. However, in this case, in order to make conveyance speeds of the rollers 13 and 23 equal to each other, it is necessary to adjust a configuration of a gear train connecting the conveyance motor and the rollers 13 and 23 and the number of rotations of the conveyance motor, which may complicate the configuration. In this regard, in the present embodiment, the lengths of the arms 14 and 24 are made different from each other in order to make the lengths A1 and A2 different from each other, and thus it is possible to prevent the above-described complication of the configuration.

The paper feed tray 20 may accommodate the rolled paper R (see FIG. 2). Therefore, a length of the paper feed tray 20 in the up-down direction D3 may be longer than a length of the paper feed tray 10 in the up-down direction D3 (see FIGS. 1 to 3). That is, the maximum accommodation number of the cut paper P in the paper feed tray 20 may be larger than that in the paper feed tray 10. In this configuration, the length A1 from the other end 14*b* of the arm 14 to the position where the roller 13 contacts the paper P and the length A2 from the other end 24*b* of the arm 24 to the position where the roller 23 contacts the paper P are different from each other. In a case where the lengths are the same as each other in the paper feed tray 10 and the paper feed tray 20, in a state where the maximum number of sheets of cut paper Pc are accommodated in each of the trays 10 and 20, angles of the arm 14 and the arm 24 with respect to a horizontal plane are different from each other, and thus, the force in the gravity direction generated by the weights of the arm 14 and the roller 13 that acts on the cut paper Pc accommodated in the paper feed tray 10 is different from the force in the gravity direction generated by the weights of the arm 24 and the roller 23 that acts on the cut paper Pc accommodated in the paper feed tray 20. In this case, there is a difference in feeding accuracy of the cut paper Pc between the paper feed tray 10 and the paper feed tray 20, and for example, a defect in paper feeding may occur in one tray. In this regard, in the present embodiment, since the length A1 in the paper feed tray 10 and the length A2 in the paper feed tray 20 are different from each other, it is possible to reduce the influence of the force in the gravity direction generated by the weights of the arm and the roller that acts on the cut paper Pc by the lengths A1 and A2, and it is possible to prevent a defect in paper feeding from occurring.

The coil spring S is provided that urges the arm 24 in a direction in which the roller 23 separates from the upper surface (medium support surface) of the support plate 62 of the paper feed tray 20 (see FIG. 2). The weights of the arm 24 and the roller 23 of the paper feed tray 20 may increase correspondingly to an increase in the length A2. In this case, the force in the gravity direction generated by the weights of the arm 24 and the roller 23 that acts on the cut paper Pc accommodated in the paper feed tray 20 is excessive, and a defect in paper feeding may occur. In this regard, in the present embodiment, since the coil spring S is provided, it is possible to reduce the force in the gravity direction, and it is possible to prevent a defect in paper feeding from occurring.

The length from the other end 24*b* to the one end 24*a* of the arm 24 is longer than the length from the other end 14*b* to the one end 14*a* of the arm 14 (see FIG. 2). Here, when the gears 26 are arranged from the other end 24*b* to the one end 24*a* of the arm 24, the number of gears 26 increases correspondingly to an increase in a length of the arm 24, and the weight of the entire arm 24 including the gears 26 may increase. In this case, as described above, the force in the gravity direction generated by the weights of the arm 24 and the roller 23 that acts on the cut paper Pc accommodated in the paper feed tray 20 is excessive, and a defect in paper feeding may occur. In this regard, in the present embodiment, the arm 24 is provided with the transmission belt 28 in addition to the gears 26. Accordingly, the number of gears 26 may be reduced, the weight of the entire arm 24 including the gears 26 may be reduced, and thus it is possible to prevent a defect in paper feeding from occurring.

The paper feed tray 20 is disposed below the paper feed tray 10 (see FIGS. 1 to 3). The stability of the entire printer 1 is improved by disposing the paper feed tray 20 below, which has a larger maximum accommodation number and has a larger weight. In addition, in a case where the paper feed tray 20 having a larger weight is located above the paper feed tray 10, when the paper feed tray 20 drops at the time of attaching and detaching the paper feed tray 20, an impact caused by the drop is large, and a user may be injured. In this regard, in the present embodiment, since the paper feed tray 20 is located below, even when the paper feed tray 20 drops, an impact caused by the drop is small, and it is possible to prevent the user from being injured.

Figure 4:
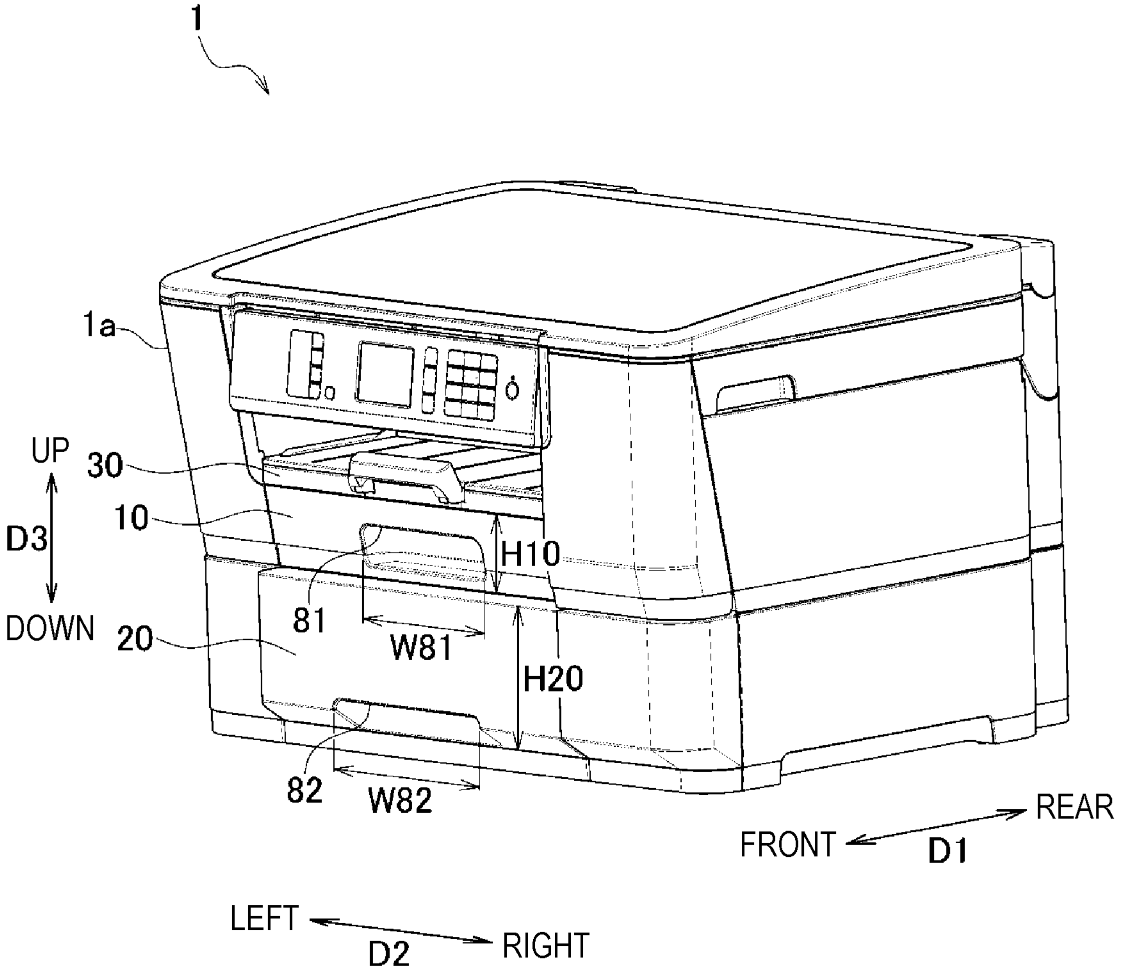
FIG. 4 is a perspective view of the printer according to the present invention.

As illustrated in FIG. 4, the printer 1 (image recording apparatus) according to another embodiment of the present invention includes the housing 1*a*, the paper feed trays 10 and 20 that are attachable to and detachable from the housing 1*a*, and the paper discharge tray 30. The paper feed tray 10 corresponds to the "first tray" of the present invention, and the paper feed tray 20 corresponds to the "second tray" of the present invention.

The paper feed trays 10 and 20 each have a box shape opening to an upper side, and are movable in a front-rear direction D1 (a first direction) with respect to the housing 1*a*. The paper feed trays 10 and 20 are pulled out from the housing 1*a* by being moved forward (to an upstream side in the front-rear direction D1) with respect to the housing 1*a*, and are attached to the housing 1*a* by being moved rearward (to a downstream side in the front-rear direction D1) with respect to the housing 1*a*. The paper feed trays 10 and 20 may take an attached position (see FIG. 4) where the paper feed trays 10 and 20 are attached to the housing 1*a* and a drawn-out position (not illustrated) forward (at the upstream side in the front-rear direction D1) of the attached position. When the paper feed trays 10 and 20 are in the attached position, the paper feed tray 20 overlaps the paper feed tray 10 in an up-down direction D3 (a third direction) and is disposed below the paper feed tray 10.

The paper feed trays 10 and 20 and the paper discharge tray 30 have substantially the same width (a length in a left-right direction D2 (a second direction)). A height (a length in the up-down direction D3) H20 of the paper feed tray 20 is larger than a height H10 of the paper feed tray 10.

Figure 5:
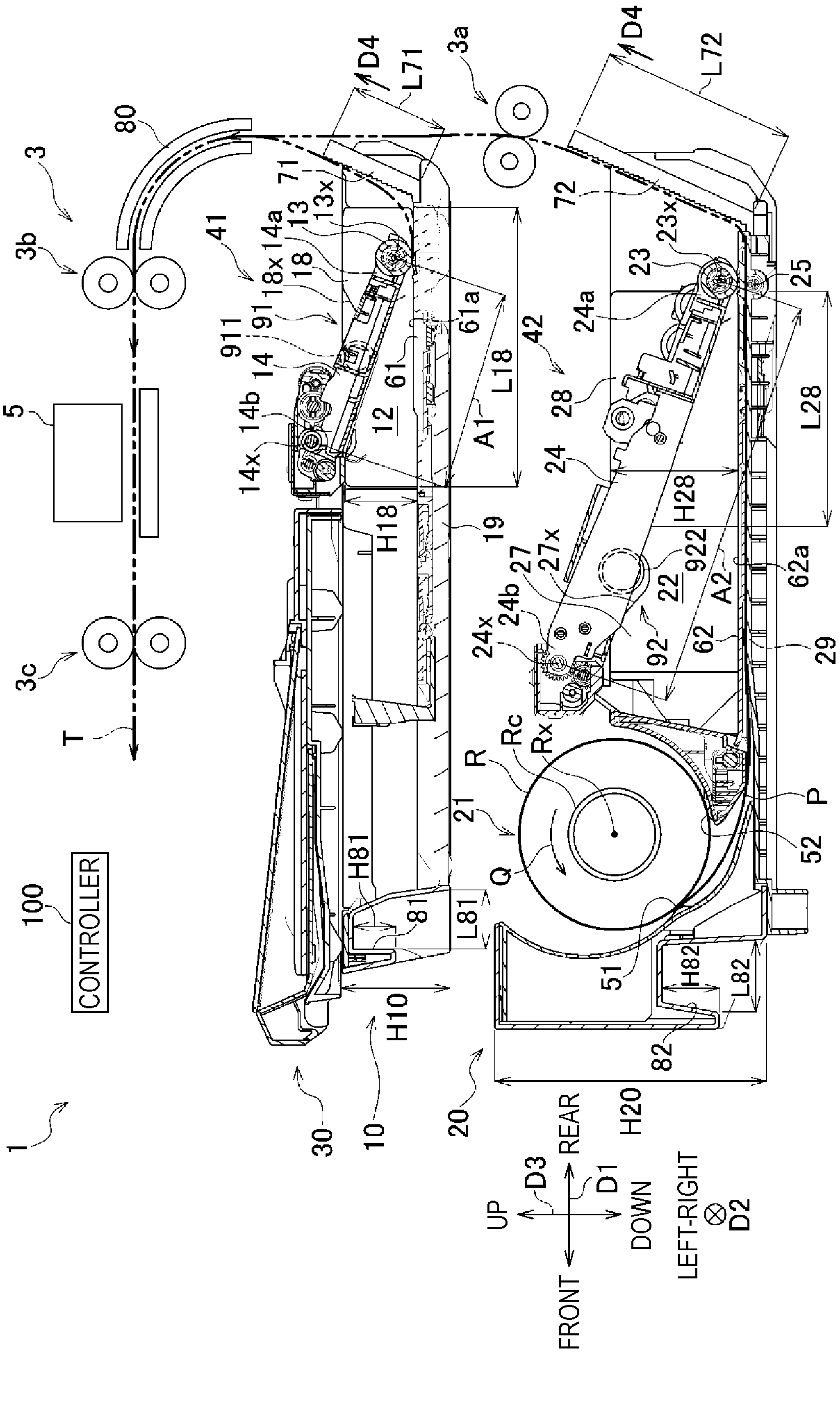
FIG. 5 is a schematic side view illustrating an internal structure of the printer in FIG. 4.

A width (a length in the left-right direction D2) W82 of a grip portion 82 of the paper feed tray 20 is larger than a width W81 of a grip portion 81 of the paper feed tray 10. In the present embodiment, the grip portions 81 and 82 are implemented by a recessed portion formed on front surfaces of the paper feed trays 10 and 20, and are gripped by a user when the user moves the paper feed trays 10 and 20 with respect to the housing 1*a*. As illustrated in FIG. 5, a depth L82 (a length in the front-rear direction D1) of the grip portion 82 is large than a depth L81 of the grip portion 81. A depth (a length in the up-down direction D3) H82 of the grip portion 82 is larger than a depth H81 of the grip portion 81.

Figure 6:
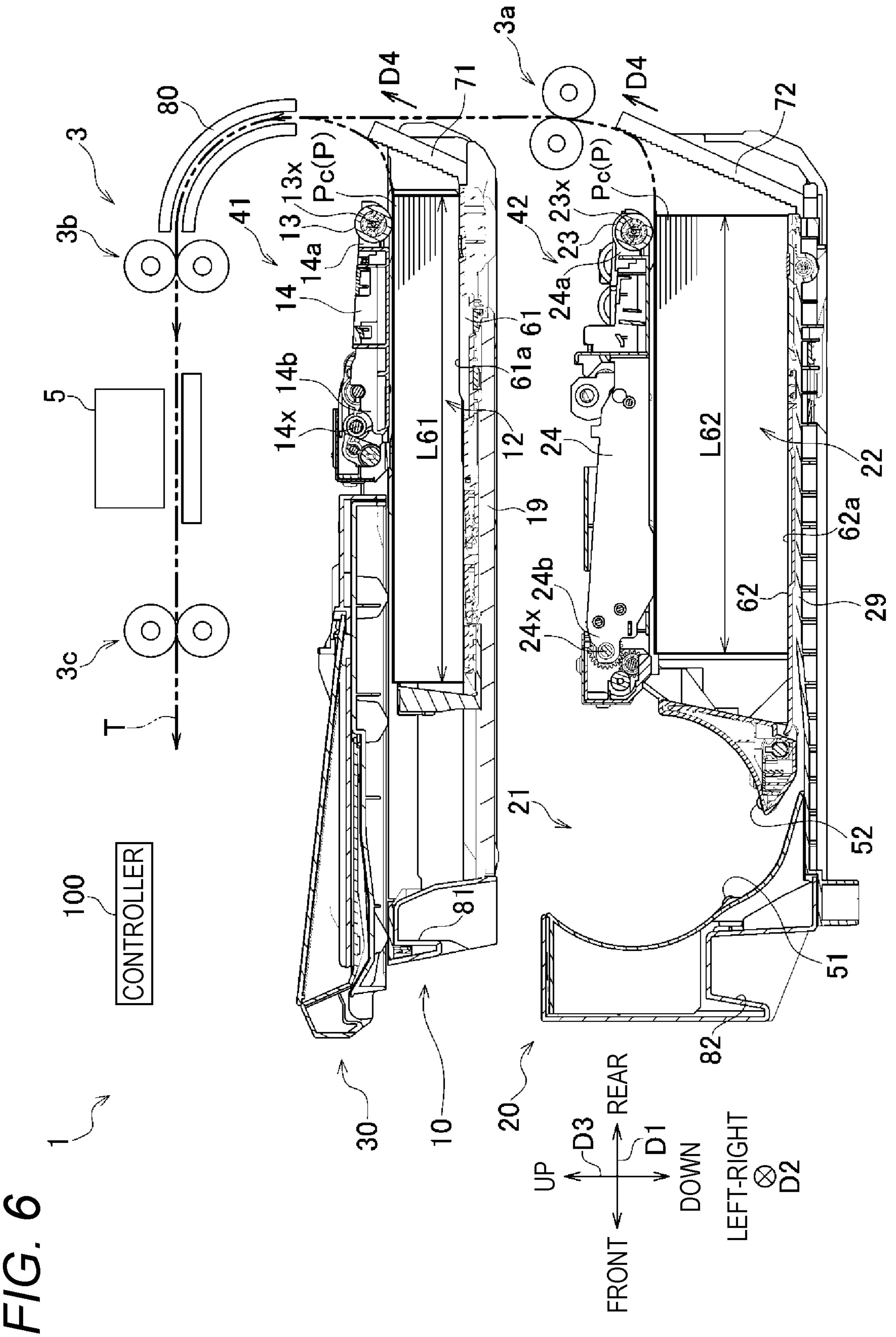
FIG. 6 is a schematic side view corresponding to FIG. 5, illustrating a state where a maximum number of sheets of cut paper are accommodated in each paper feed tray in the printer in FIG. 4.

As illustrated in FIGS. 5 and 6, the printer 1 further includes the conveying mechanism 3, the head 5, and the control unit 100. Elements of the conveying mechanism 3 other than the rollers 51 and 52, which will be described later, the head 5, and the control unit 100 are supported by the housing 1*a*.

The conveying mechanism 3 is configured to selectively convey paper P from the paper feed trays 10 and 20, and includes the rollers 51 and 52, the rollers 13 and 23, the arms 14 and 24, the roller pairs 3*a* to 3*c*, the separating members 71 and 72, the pair of guide members 80, and a conveyance motor (not illustrated) for driving the rollers. The paper P in each of the paper feed trays 10 and 20 is conveyed by the conveying mechanism 3 along a conveyance path T that passes between the pair of guide members 80, below the head 5, and toward the paper discharge tray 30.

In the conveying mechanism 3, the roller 13 and the arm 14 constitute a feeding mechanism 41 capable of feeding the paper P accommodated in the paper feed tray 10. In the conveying mechanism 3, the rollers 51 and 52, the roller 23, and the arm 24 constitute a feeding mechanism 42 capable of feeding the paper P accommodated in the paper feed tray 20.

The paper P is a general term of the paper P unwound from rolled paper R described later and cut paper Pc, and corresponds to the "sheet medium" of the present invention. The cut paper Pc is paper P having a shorter length along the conveyance path T than the paper P constituting the rolled paper R.

The paper feed tray 10 includes the cut paper accommodating portion 12 capable of accommodating a plurality of sheets of cut paper Pc (see FIG. 6) stacked in the up-down direction D3. The cut paper Pc accommodated in the cut paper accommodating portion 12 is supported on an upper surface of the support plate 61 disposed along the bottom plate 19 of the paper feed tray 10. That is, the upper surface of the support plate 61 corresponds to a support surface 61*a* that supports the paper P.

The roller 13 (corresponding to the "first roller" of the present invention) is supported by the one end 14*a* of the arm 14 (corresponding to the "first arm" of the present invention) and is rotatable about the shaft 13*x* extending along the left-right direction D2. The other end 14*b* of the arm 14 is supported by the housing 1*a* (see FIG. 4) via the shaft 14*x* extending along the left-right direction D2. The arm 14 is rotatable about the shaft 14*x* with the other end 14*b* serving as a fulcrum (see FIGS. 5 and 6).

When no cut paper Pc is accommodated in the cut paper accommodating portion 12 in a state where the paper feed tray 10 is attached to the housing 1*a*, the roller 13 comes into contact with the support surface 61*a* (see FIG. 5). When the cut paper Pc is accommodated in the cut paper accommodating portion 12 in a state where the paper feed tray 10 is attached to the housing 1*a*, the roller 13 comes into contact with the uppermost sheet of the cut paper Pc accommodated in the cut paper accommodating portion 12 (see FIG. 6). At this time, the conveyance motor performs driving under the control of the control unit 100 to rotate the roller 13, whereby the cut paper Pc is fed from the front (upstream side) toward the rear (downstream side) in the front-rear direction D1.

The cut paper Pc fed from the paper feed tray 10 by the roller 13 comes into contact with the separating member 71, moves along the separating member 71, and is guided to between the pair of guide members 80.

The separating member 71 is disposed at a rear side (downstream side in the front-rear direction D1) of the roller 13. The separating member 71 extends in an oblique direction D4 intersecting both the front-rear direction D1 and the up-down direction D3. In other words, the separating member 71 is inclined so as to be positioned higher while going toward the rear side. On a front surface of the separating member 71 defining the conveyance path T, a fine unevenness is formed repeatedly along the conveyance path T. With the unevenness, multi-feed (a phenomenon where a plurality of sheets of cut paper Pc are conveyed in an overlapped state) is prevented. That is, the separating member 71 has a function of separating the cut paper Pc contacting the roller 13 from the other sheets of cut paper Pc.

The paper feed tray 20 includes the rolled paper accommodating portion 21 capable of accommodating the rolled paper R (see FIG. 5), and the cut paper accommodating portion 22 capable of accommodating a plurality of sheets of cut paper Pc (see FIG. 6) stacked in the up-down direction D3. The cut paper accommodating portion 22 corresponds to a "first accommodating portion" of the present invention, and the rolled paper accommodating portion 21 corresponds to a "second accommodating portion" of the present invention. The cut paper Pc accommodated in the cut paper accommodating portion 22 is supported on an upper surface of the support plate 62 disposed along the bottom plate 29 of the paper feed tray 20. That is, the upper surface of the support plate 62 corresponds to a support surface 62*a* that supports the paper P.

In the paper feed tray 20, when the rolled paper R is used, the cut paper Pc is removed from the cut paper accommodating portion 22 (see FIG. 5), and when the cut paper Pc is used, the rolled paper R is removed from the rolled paper accommodating portion 21 (see FIG. 6). The cut paper accommodating portion 22 is a space behind the rolled paper accommodating portion 21.

Figure 7:
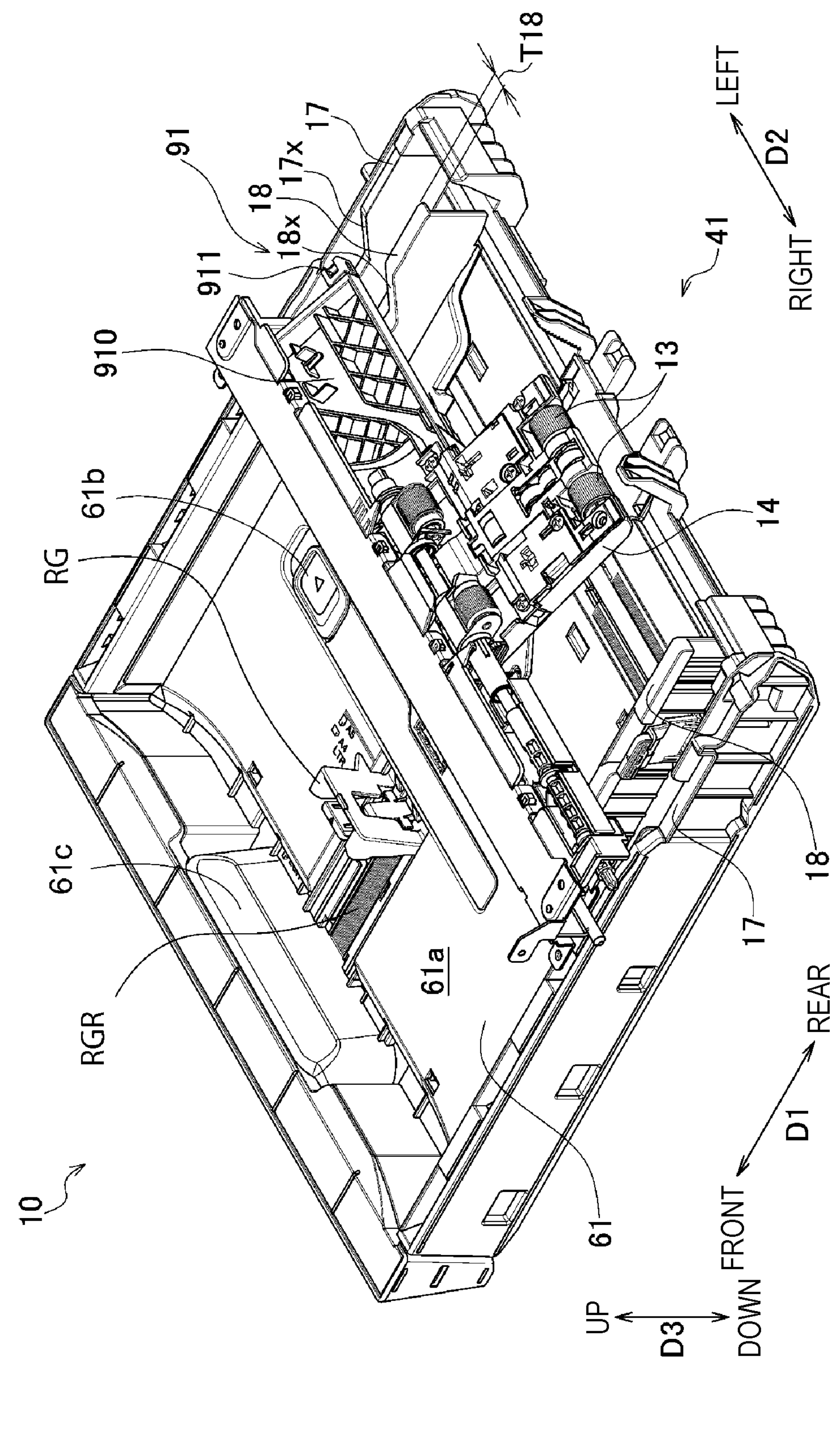
FIG. 7 is a perspective view illustrating an upper paper feed tray provided in the printer in FIG. 4.

The number of sheets of cut paper Pc that may be accommodated in the cut paper accommodating portion 22 is larger than the number of sheets of cut paper Pc that may be accommodated in the cut paper accommodating portion 12. A length L61 of the support surface 61*a* of the cut paper accommodating portion 12 in the front-rear direction D1 is longer than a length L62 of the support surface 62*a* of the cut paper accommodating portion 22 in the front-rear direction D1 (see FIG. 6). That is, a length of the cut paper Pc in the front-rear direction D1 that may be accommodated in the cut paper accommodating portion 12 is longer than a length of the cut paper Pc in the front-rear direction D1 that may be accommodated in the cut paper accommodating portion 22. For example, the cut paper Pc having a long side and a short side is arranged at a longitudinal arrangement in which the long side is parallel to the front-rear direction D1 when the cut paper Pc is accommodated in the cut paper accommodating portion 12, and arranged at a lateral arrangement in which the short side is parallel to the front-rear direction D1 when the cut paper Pc is accommodated in the cut paper accommodating portion 22. The cut paper Pc may be accommodated in the cut paper accommodating portion 12 at the lateral arrangement. A size of the cut paper Pc may be A4 size or letter-size. As shown in FIG. 7, the paper feed tray 10 includes a rear guide rail RGR extending in the front-rear direction D1 and a rear guide RG movable along the rear guide rail RGR in the front-rear direction D1. A positioning of the cut paper Pc accommodated in the paper feed tray 10 may be performed by moving the rear guide RG along the rear guide rail RGR and having the rear guide RG be in contact with a front edge of the cut paper Pc.

The roller 23 (corresponding to the "second roller" of the present invention) is supported by the one end 24*a* of the arm 24 (corresponding to the "second arm" of the present invention) and is rotatable about the shaft 23*x* extending along the left-right direction D2. The other end 24*b* of the arm 24 is supported by the housing 1*a* (see FIG. 4) via the shaft 24*x* extending along the left-right direction D2. The arm 24 is rotatable about the shaft 24*x* with the other end 24*b* serving as a fulcrum (see FIGS. 5 and 6).

Here, a length of the arm 24 (a length from the other end 24*b* to the one end 24*a*) is longer than a length of the arm 14 (a length from the other end 14*b* to the one end 14*a*). A length A2 from the other end 24*b* of the arm 24 to a position where the roller 23 contacts the paper P is longer than a length A1 from the other end 14*b* of the arm 14 to a position where the roller 13 contacts the paper P (see FIG. 5).

When no cut paper Pc is accommodated in the cut paper accommodating portion 22 in a state where the paper feed tray 20 is attached to the housing 1*a*, the roller 23 comes into contact with the support surface 62*a* (see FIG. 5). When the cut paper Pc is accommodated in the cut paper accommodating portion 22 in a state where the paper feed tray 20 is attached to the housing 1*a*, the roller 23 comes into contact with the uppermost sheet of the cut paper Pc accommodated in the cut paper accommodating portion 22 (see FIG. 6). At this time, the conveyance motor performs driving under the control of the control unit 100 to rotate the roller 23, whereby the cut paper Pc is fed from the front (upstream side) toward the rear (downstream side) in the front-rear direction D1.

The rolled paper R is obtained by winding a long sheet of paper P in a roll shape around an outer circumferential surface of a cylindrical core member Rc, and corresponds to the "roll body" of the present invention. The rolled paper R is accommodated in the rolled paper accommodating portion 21 in a state where a rotation axis Rx (a center axis of the core member Rc) is along the left-right direction D2.

The rollers 51 and 52 are disposed at a bottom portion of the rolled paper accommodating portion 21. The rollers 51 and 52 are rotatable about an axis extending in the left-right direction D2. When the rolled paper R is accommodated in the rolled paper accommodating portion 21, an outer circumferential surface of a lower portion of the rolled paper R is supported by the rollers 51 and 52. When setting the rolled paper R, the rolled paper R is manually rotated in an arrow direction Q in FIG. 5, and the paper P is unrolled from the rolled paper R. The paper P is passed through a gap between a lower surface of the support plate 62 and an upper surface of the bottom plate 29, and a leading end of the paper P is sandwiched between the roller 23 and the roller 25. In this state, the conveyance motor performs driving under the control of the control unit 100 to rotate the rollers 51, 52, and 23, whereby the paper P unwound from the rolled paper R is fed from the front (upstream side) toward the rear (downstream side) in the front-rear direction D1.

The paper P fed by the roller 23 from the paper feed tray 20 (the paper P unwound from the rolled paper R accommodated in the rolled paper accommodating portion 21, or the cut paper Pc accommodated in the cut paper accommodating portion 22) comes into contact with the separating member 72, moves along the separating member 72, and is guided to the roller pair 3*a*.

The separating member 72 is disposed at a rear side (downstream side in the front-rear direction D1) of the roller 23. Similar to the separating member 71, the separating member 72 extends in the oblique direction D4. In other words, the separating member 72 is inclined so as to be positioned higher while going toward the rear side. On a front surface of the separating member 72 defining the conveyance path T, a fine unevenness is formed repeatedly along the conveyance path T. With the unevenness, multi-feed (a phenomenon where a plurality of sheets of cut paper Pc are conveyed in an overlapped state) is prevented. That is, the separating member 72 has a function of separating the cut paper Pc contacting the roller 23 from the other sheets of cut paper Pc.

A length L72 of the separating member 72 in the oblique direction D4 is longer than a length L71 of the separating member 71 in the oblique direction D4 (see FIG. 5).

The head 5 (corresponding to the "recording unit" of the present invention) includes a plurality of nozzles (not illustrated) formed on a lower surface thereof and a driver IC. When the paper P conveyed by the conveying mechanism 3 passes through a position facing the lower surface of the head 5, the driver IC is driven under the control of the control unit 100. Accordingly, ink is ejected from the nozzles and lands on the paper P, and an image is recorded on the paper P. The head 5 may be of a line type that ejects ink from the nozzles in a state where a position thereof is fixed, or a serial type that ejects ink from the nozzles while moving in the left-right direction D2.

The control unit 100 is connected to the conveyance motor and the driver IC via an internal bus (not illustrated). The control unit 100 includes a central processing unit (CPU), a read only memory (ROM), and a random access memory (RAM). The ROM stores a program and data for the CPU to perform various type of control. The RAM temporarily stores data used when the CPU executes the program.

Figure 8:
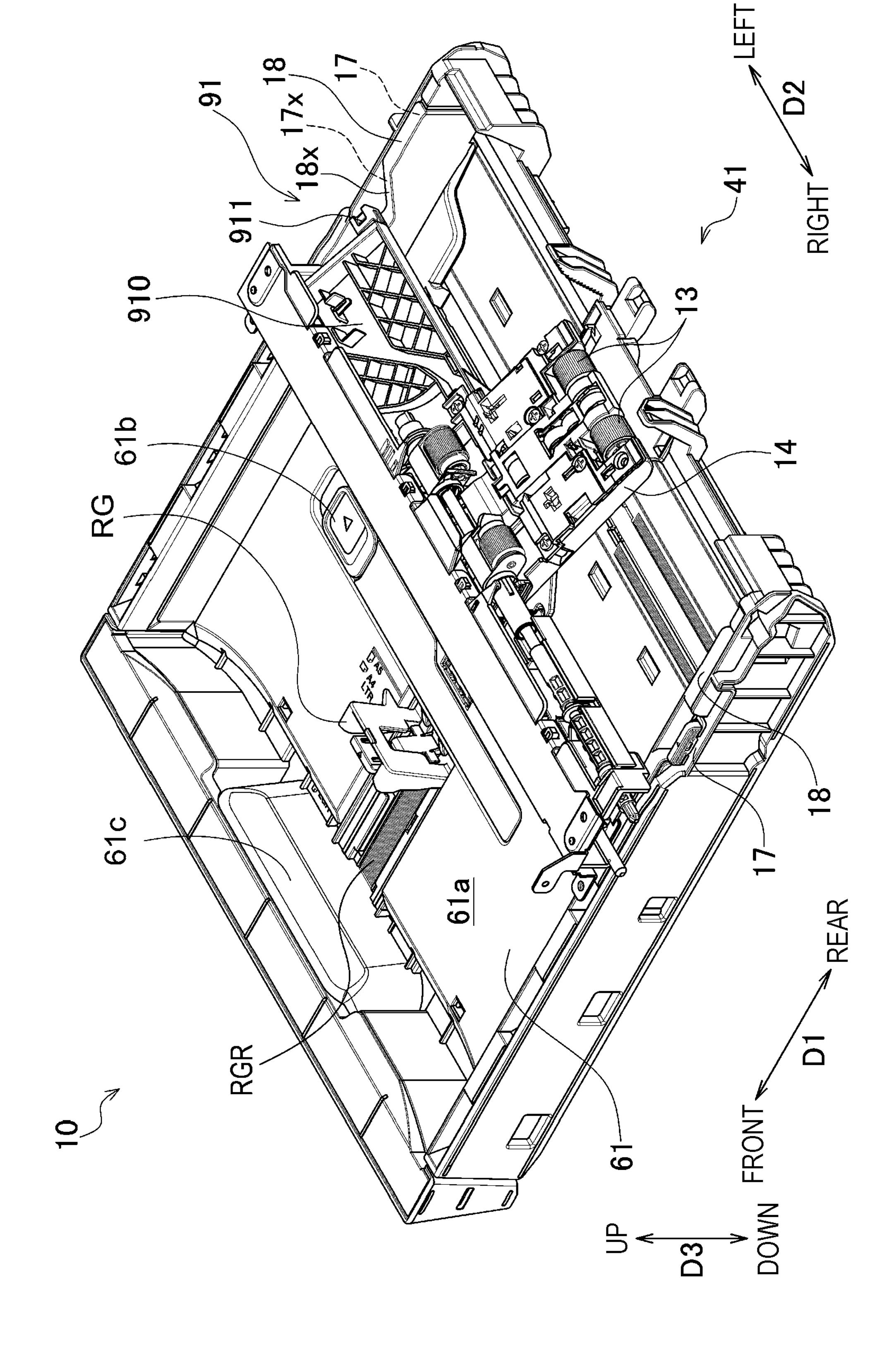
FIG. 8 is a perspective view illustrating a state where a side guide is disposed in a covering position in the paper feed tray in FIG. 7.

As illustrated in FIGS. 7 and 8, the paper feed tray 10 has a pair of side walls 17 and a pair of side guides 18 in addition to the bottom plate 19 and the support plate 61 described above.

The pair of side walls 17 are formed of plate members constituting left and right side surfaces of the paper feed tray 10, respectively, and are spaced apart from each other in the left-right direction D2. The pair of side walls 17 sandwich the paper P (the cut paper Pc supported by the support surface 61*a*) in the left-right direction D2.

The pair of side guides 18 are disposed at an inner side of the pair of side walls 17, and may come into contact with ends of the paper P (the cut paper Pc supported by the support surface 61*a*) in the left-right direction D2. The pair of side guides 18 are formed of plate-shaped members disposed parallel to the side walls 17, and are spaced apart from each other in the left-right direction D2. Each side guide 18 is movable in the left-right direction D2. The user may adjust a position of the side guide 18 in the left-right direction D2 in accordance with a length of the paper P in the left-right direction D2.

Similarly to the paper feed tray 10, the paper feed tray 20 also includes a pair of side walls 27 and a pair of side guides 28. FIG. 5 illustrates one of the pair of side walls 27 and one of the pair of side guides 28.

The pair of side walls 27 have substantially the same configuration as the pair of side walls 17 (see FIGS. 7 and 8), and are formed of plate members constituting left and right side surfaces of the paper feed tray 20, respectively, and are spaced apart from each other in the left-right direction D2. The pair of side walls 27 sandwich the paper P (the paper P unwound from the rolled paper R, or the cut paper Pc supported by the support surface 62*a*) in the left-right direction D2.

The pair of side guides 28 have substantially the same configuration as the pair of side guides 18 (see FIGS. 7 and 8), are disposed at an inner side of the pair of side walls 27, and may come into contact with ends of the paper P (the paper P unwound from the rolled paper R, or the cut paper Pc supported by the support surface 62*a*) in the left-right direction D2. The pair of side guides 28 are formed of plate-shaped members disposed parallel to the side walls 27, and are spaced apart from each other in the left-right direction D2. Each side guide 28 is movable in the left-right direction D2. The user may adjust a position of the side guide 28 in the left-right direction D2 in accordance with a length of the paper P in the left-right direction D2.

The side guides 18 and 28 have different lengths in each of the front-rear direction D1, the left-right direction D2, and the up-down direction D3.

A length L18 of the side guide 18 in the front-rear direction D1 is longer than a length L28 of the side guide 28 in the front-rear direction D1 (see FIG. 5). For example, L18 may be approximately 92 mm, L28 may be approximately 87 mm, and a difference in length may be 5 mm or more.

A thickness T18 (a length in the left-right direction D2) of the side guide 18 (see FIG. 7) is greater than a thickness T28 of the side guide 28. For example, T18 may be approximately 8.3 mm, T28 may be approximately 8.15 mm, and a difference in thickness may be 0.15 mm or more.

A length H18 of the side guide 18 in the up-down direction D3 is shorter than a length H28 of the side guide 28 in the up-down direction D3 (see FIG. 5).

The side guides 18 and 28 are located at different positions in the front-rear direction D1. A center of the side guide 18 in the front-rear direction D1 does not coincide with a center of the side guide 28 in the front-rear direction D1, and is at a rear side of the center of the side guide 28 in the front-rear direction D1.

In a region in which the side guide 18 is disposed in the front-rear direction D1, a slide member 911 of a retreating mechanism 91 to be described later is provided. On the other hand, in a region in which the side guide 28 is disposed in the front-rear direction D1, a rotary member 922 of a retreating mechanism 92 to be described later is not provided.

The retreating mechanisms 91 and 92 are provided for the paper feed trays 10 and 20 (see FIG. 5). The retreating mechanisms 91 and 92 are mechanisms for moving the arms 14 and 24 and the rollers 13 and 23 to retreated positions (positions not interfering with the movement of the paper feed trays 10 and 20) in conjunction with the movement of the paper feed trays 10 and 20 from the attached positions to the drawn-out positions.

As illustrated in FIGS. 7 and 8, the retreating mechanism 91 (corresponding to a "first retreating mechanism" of the present invention) is provided for the paper feed tray 10, and includes the slide member 911 attached to the arm 14, a recessed portion 17*x* formed in the left side wall 17, and a recessed portion 18*x* formed in the left side guide 18. As illustrated in FIGS. 7 and 8, the slide member 911 is coupled to the arm 14 via a coupling member 910 that extends to a left side from the arm 14.

Figure 9:
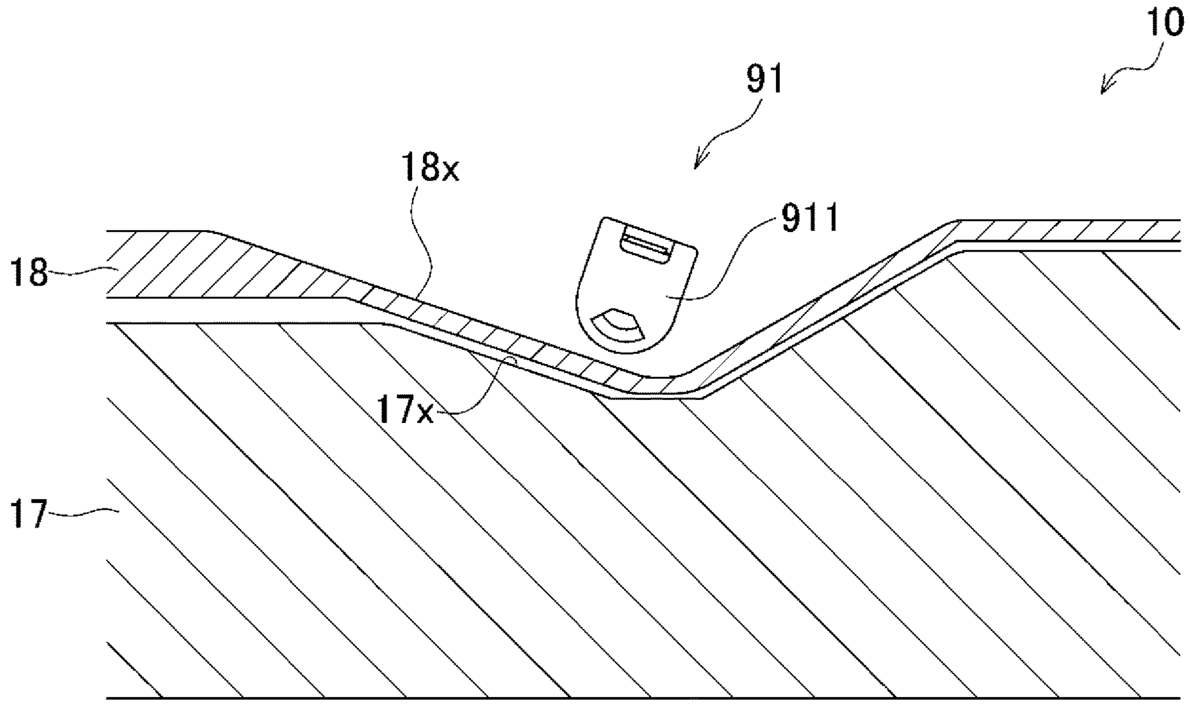
FIG. 9 is a cross-sectional view illustrating the side guide disposed in the covering position in FIG. 8.

Here, when the left side guide 18 moves in the left-right direction D2, the left side guide 18 may take a covering position (see FIG. 8) where the left side guide 18 covers the left side wall 17 in the up-down direction D3 and a non-covering position (see FIG. 7) where the left side guide 18 does not cover the left side wall 17 in the up-down direction D3. When the left side guide 18 is in the covering position, an upper wall of the left side guide 18 is positioned above the left side wall 17 (see FIG. 9). At this time, the recessed portion 17*x* of the left side wall 17 and the recessed portion 18*x* of the left side guide 18 overlap each other in the up-down direction D3.

When the paper feed tray 10 is in the attached position and the left side guide 18 is in the covering position, the slide member 911 is positioned in the recessed portions 17*x* and 18*x* as illustrated in FIG. 8. At this time, the slide member 911 faces the left side guide 18 in the up-down direction D3 with a slight gap therebetween.

When the paper feed tray 10 is in the attached position and the left side guide 18 is in the non-covering position, the slide member 911 is positioned in the recessed portion 17*x* as illustrated in FIG. 7. At this time, the slide member 911 does not face the left side guide 18 in the up-down direction D3, but faces the left side wall 17 in the up-down direction D3 with a slight gap therebetween.

When the paper feed tray 10 moves from the attached position to the drawn-out position in a state where the left side guide 18 is disposed in the covering position, the slide member 911 slides along a top surface of the left side guide 18 (a bottom surface of the recessed portion 18*x*) while being supported by the left side guide 18. In a process in which the paper feed tray 10 reaches the drawn-out position from the attached position, the slide member 911 passes over the recessed portion 18*x* and reaches an upper surface of the side guide 18. Accompanying an operation of the slide member 911, the arm 14 rotates, and the arm 14 and the roller 13 reach the retreated position.

When the paper feed tray 10 moves from the attached position to the drawn-out position in a state where the left side guide 18 is disposed in the non-covering position, the slide member 911 slides along a top surface of the left side wall 17 (a bottom surface of the recessed portion 17*x*) while being supported by the left side wall 17. In a process in which the paper feed tray 10 reaches the drawn-out position from the attached position, the slide member 911 passes over the recessed portion 17*x* and reaches an upper surface of the side wall 17. Accompanying the operation of the slide member 911, the arm 14 rotates, and the arm 14 and the roller 13 reach the retreated position.

When the paper feed tray 10 moves from the drawn-out position to the attached position, a reverse operation of the operation at the time when the paper feed tray 10 moves from the attached position to the drawn-out position is performed.

Figure 10:
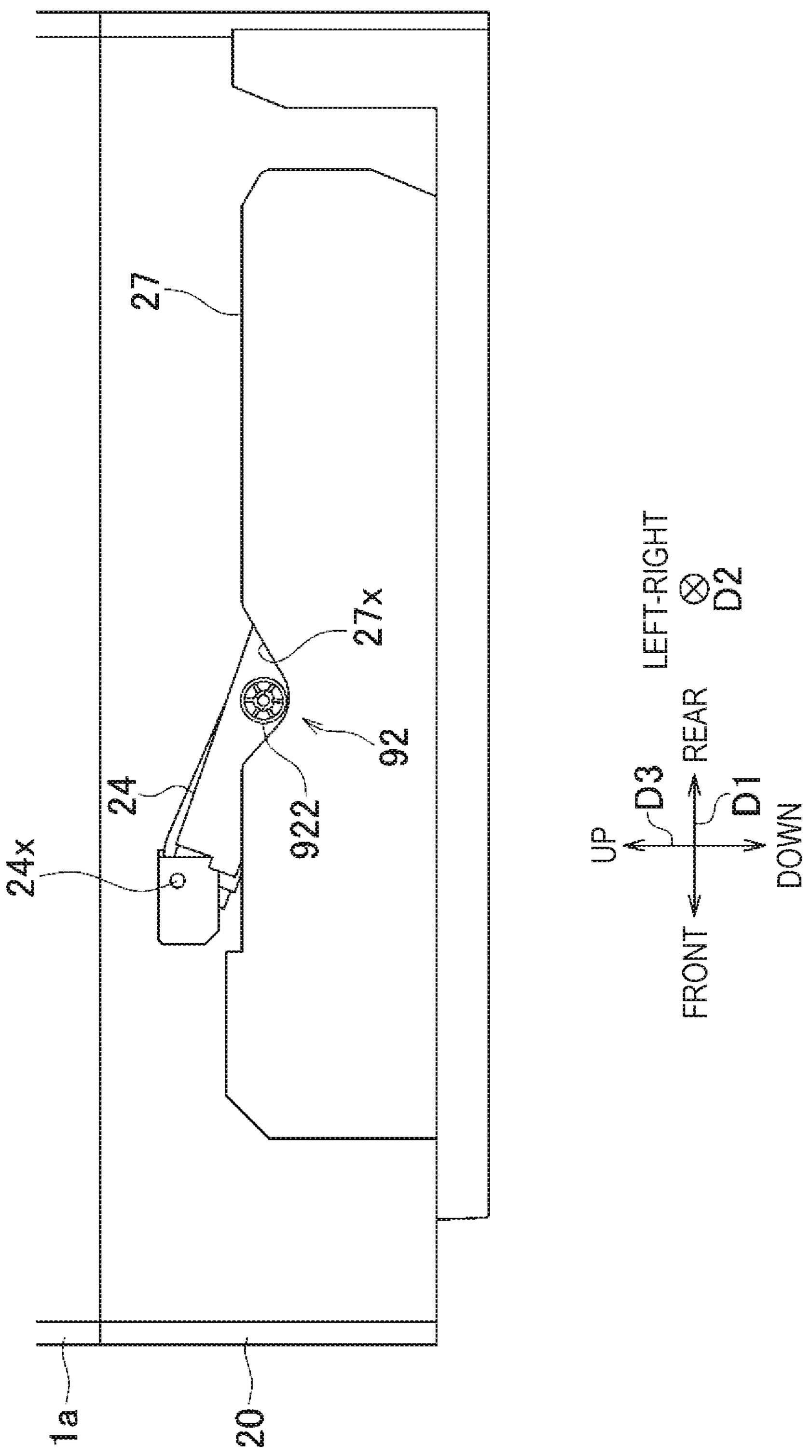
FIG. 10 is a schematic side view illustrating a state where a lower paper feed tray provided in the printer in FIG. 4 is in an attached position.
Figure 11:
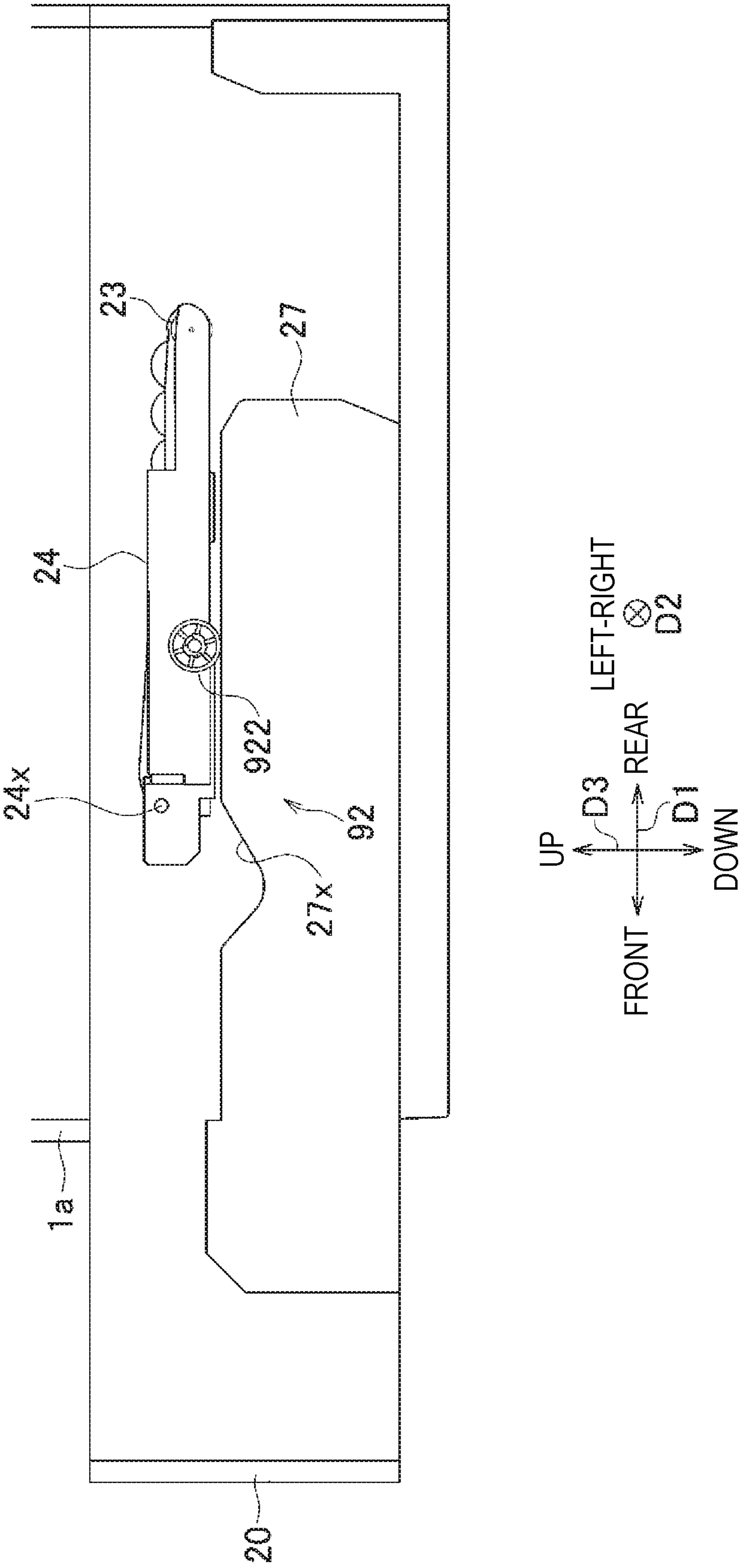
FIG. 11 is a schematic side view illustrating a state where the paper feed tray in FIG. 10 is moved from the attached position to a drawn-out position and an arm and a roller are moved to a retreated position.

As illustrated in FIGS. 10 and 11, the retreating mechanism 92 (corresponding to a "second retreating mechanism" of the present invention) is provided for the paper feed tray 20, and includes the rotary member 922 attached to the arm 24 and a recessed portion 27*x* formed in the side wall 27. The rotary member 922 is coupled to the arm 24 via a coupling member (not illustrated) that extends from the arm 24 in the left-right direction.

While only one slide member 911 is provided at a left side of the arm 14, two rotary members 922 are provided at right and left sides of the arm 24. That is, the number (two) of the rotary members 922 is larger than the number (one) of the slide members 911.

When the paper feed tray 20 is in the attached position, the rotary member 922 is positioned in the recessed portion 27*x* as illustrated in FIG. 10. At this time, the rotary member 922 faces the side wall 27 in the up-down direction D3 with a slight gap therebetween.

When the paper feed tray 20 moves from the attached position to the drawn-out position, the rotary member 922 rotates along a top surface of the side wall 27 (a bottom surface of the recessed portion 27*x*) while being supported by the side wall 27. In a process in which the paper feed tray 20 reaches the drawn-out position from the attached position, the rotary member 922 passes over the recessed portion 27*x* and reaches an upper surface of the side wall 27 as illustrated in FIG. 11. Accompanying an operation of the rotary member 922, the arm 24 rotates about the shaft 24*x*, and the arm 24 and the roller 23 reach the retreated position.

When the paper feed tray 20 moves from the drawn-out position to the attached position, a reverse operation of the operation at the time when the paper feed tray 20 moves from the attached position to the drawn-out position is performed.

As described above, according to the present embodiment, in the paper feed trays 10 and 20, the lengths L18 and L28 of the side guides 18 and 28 in the front-rear direction D1 are different from each other (see FIG. 5). Accordingly, it is possible to prevent occurrences such as a degradation in a guide function of the side guides 18 and 28 that occur when forms of the paper P supported in the paper feed trays 10 and 20 (the length of the cut paper Pc in the front-rear direction D1, etc.) are different from each other.

According to the present embodiment, the side guides 18 and 28 of the paper feed trays 10 and 20 are different from each other in at least one (all in the present embodiment) of the lengths L18 and L28 in the front-rear direction D1, the thicknesses (lengths in the left-right direction D2) T18 and T28, and the lengths H18 and H28 in the up-down direction D3 (see FIGS. 5, 7, and the like). Accordingly, it is possible to prevent occurrences such as a degradation in the guide function of the side guides 18 and 28 that occur when forms of the paper P supported in the paper feed trays 10 and 20 (cut paper Pc, rolled paper, etc.) are different from each other.

The support surface 61*a* of the paper feed tray 10 is longer than the support surface 62*a* of the paper feed tray 20 in the front-rear direction D1 (L61>L62 in FIG. 6). In this configuration, the length L18 of the side guide 18 of the paper feed tray 10 in the front-rear direction D1 is longer than the length L28 of the side guide 28 of the paper feed tray 10 in the front-rear direction D1 (see FIG. 5). Accordingly, in the paper feed tray 10, the paper P long in the front-rear direction D1 may be appropriately guided by the side guide 18 long in the front-rear direction D1.

The paper feed tray 20 includes not only the cut paper accommodating portion 22 but also the rolled paper accommodating portion 21. Therefore, the length of the support surface 62*a* in the front-rear direction D1 may be reduced (see FIG. 6). Accordingly, in this case, it is possible to more effectively implement a configuration in which the support surface 61*a* of the paper feed tray 10 is longer than the support surface 62*a* of the paper feed tray 20 in the front-rear direction D1.

The feeding mechanisms 41 and 42 are an arm feeding system involving rotation of the arms 14 and 24. The length A2 from the other end 24*b* of the arm 24 to the position where the roller 23 contacts the paper P is longer than the length A1 from the other end 14*b* of the arm 14 to the position where the roller 13 contacts the paper P (see FIG. 5). In this configuration, the length L18 of the side guide 18 of the paper feed tray 10 in the front-rear direction D1 is longer than the length L28 of the side guide 28 of the paper feed tray 10 in the front-rear direction D1. In order to prevent an occurrence that the presence of the arms 14 and 24 and the rollers 13 and 23 makes it impossible to smoothly move the paper feed trays 10 and 20 with respect to the housing 1*a*, it is conceivable to move the arms 14 and 24 and the rollers 13 and 23 to the retreated positions by the retreating mechanisms 91 and 92 in conjunction with the movement of the paper feed trays 10 and 20 from the attached positions to the drawn-out positions while supporting the slide member 911 and the rotary members 922 on the side guides 18 and 28 or the side walls 17 and 27 as in the present embodiment. However, the side guides 18 and 28 are generally smaller in thickness and strength than the side walls 17 and 27, and may be damaged when applied with a large load. Since weights of the arm 24 and the roller 23 of the paper feed tray 20 may increase correspondingly to an increase in the length A2, it is preferable that the rotary member 922 is not supported by the side guide 28 but supported by the side wall 27. In the present embodiment, since the side guide 28 is shortened in the front-rear direction D1, it is possible to effectively obtain a configuration in which the rotary member 922 is supported not by the side guide 28 but by the side wall 27, and it is possible to prevent damage to the side guide 28.

The length from the other end 24*b* to the one end 24*a* of the arm 24 is longer than the length from the other end 14*b* to the one end 14*a* of the arm 14 (see FIG. 5). In order to make the lengths A1 and A2 different from each other, it is conceivable to make diameters of the rollers 13 and 23 different from each other. However, in this case, in order to make conveyance speeds of the rollers 13 and 23 equal to each other, it is necessary to adjust a configuration of a gear train connecting the conveyance motor and the rollers 13 and 23 and the number of rotations of the conveyance motor, which may complicate the configuration. In this regard, in the present embodiment, the lengths of the arms 14 and 24 are made different from each other in order to make the lengths A1 and A2 different from each other, and thus it is possible to prevent the above-described complication of the configuration.

Since weights of the arm 14 and the roller 13 of the paper feed tray 10 may be reduced correspondingly to an increase in the length A1, the slide member 911 is supported by the side guide 18 having a relatively lower strength. On the other hand, since the weights of the arm 24 and the roller 23 of the paper feed tray 20 may increase correspondingly to an increase in the length A2, the rotary member 922 is supported by the side wall 27 having a relatively higher strength, and further the load on the side wall 27 is reduced by rotating the rotary member 922. Accordingly, the side wall 27 may be prevented from being damaged by the weights of the arm 24 and the roller 23.

The number (two) of the rotary members 922 is larger than the number (one) of the slide members 911. In this case, the load on the side wall 27 may be further reduced by increasing the number of rotary members 922. Accordingly, the side wall 27 may be more reliably prevented from being damaged by the weights of the arm 24 and the roller 23.

The thickness T18 (the length in the left-right direction D2) of the side guide 18 (see FIG. 7) is greater than the thickness of the side guide 28. In this case, the slide member 911 may be reliably supported by the side guide 18.

When the paper feed tray 10 moves between the drawn-out position and the attached position (that is, when the paper feed tray 10 moves from the attached position to the drawn-out position and when the paper feed tray 10 moves from the drawn-out position to the attached position) in a state where the side guide 18 is disposed in the covering position, the slide member 911 is slidable along the top surface of the side guide 18 while being supported by the side guide 18. By supporting the slide member 911 not on the side wall 17 but on the side guide 18 in this way, wear of the side wall 17 due to contact with the slide member 911 may be avoided. Accordingly, it is possible to prevent an occurrence that, when the paper feed tray 10 moves with respect to the housing 1*a*, the arm 14 does not rotate due to the wear of the side wall 17 and the movement is be smoothly performed.

The height (the length in the up-down direction D3) H20 of the paper feed tray 20 is larger than the height H10 of the paper feed tray 10. Therefore, the paper feed tray 20 may be configured to have a larger maximum accommodation number of the cut paper Pc and a larger weight than the paper feed tray 10. In this configuration, the width (the length in the left-right direction D2) W82 of the grip portion 82 of the paper feed tray 20 is made larger than the width W81 of the grip portion 81 of the paper feed tray 10, the depth (the length in the front-rear direction D1) L82 of the grip portion 82 is made larger than the depth L81 of the grip portion 81, and the depth (the length in the up-down direction D3) H82 of the grip portion 82 is made larger than the depth H81 of the grip portion 81. By increasing a size of the grip portion

82 in this way, it is possible to easily perform an operation on the paper feed tray 20 (such as moving work with respect to the housing 1*a*).

Figure 12:
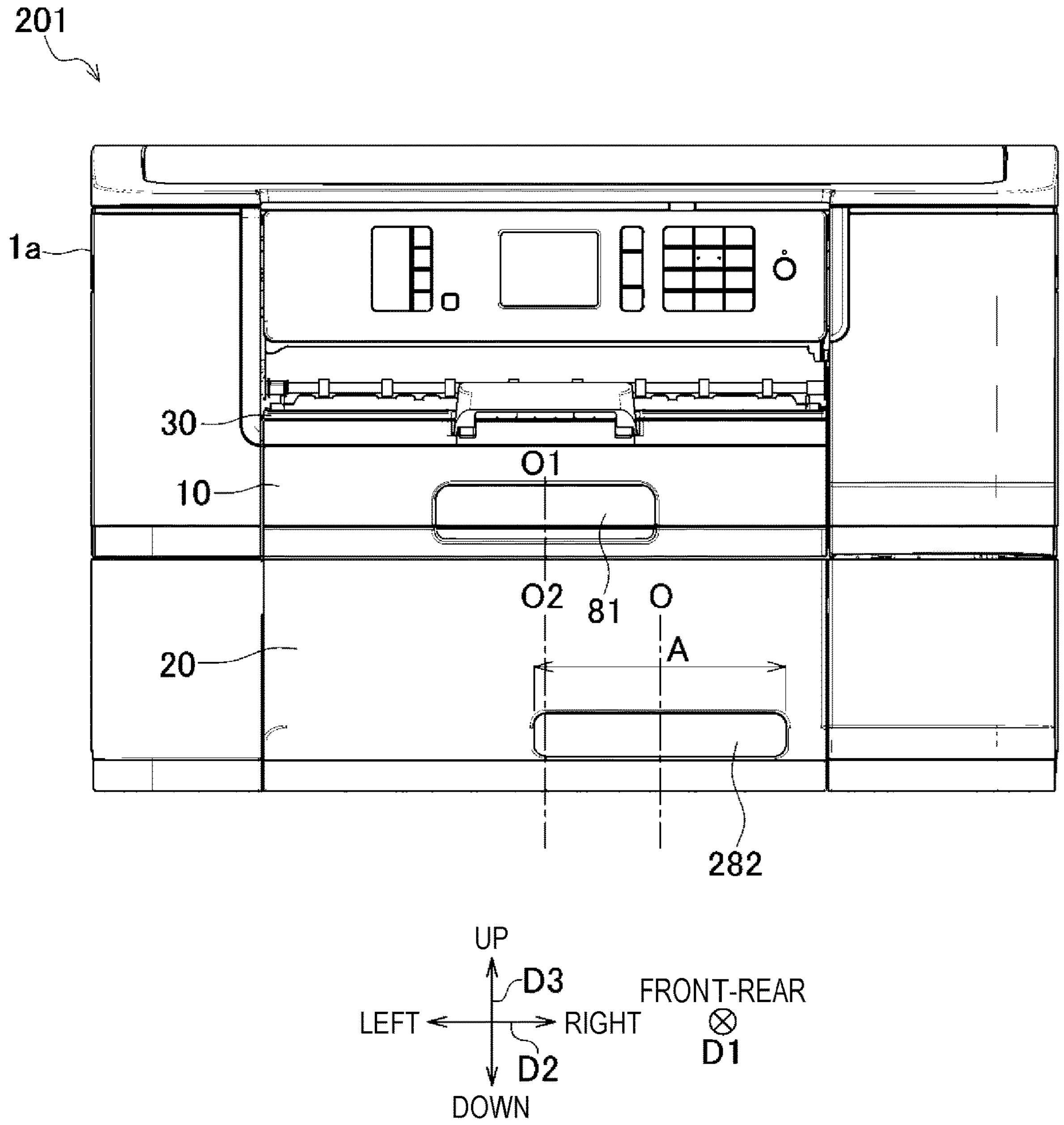
FIG. 12 is a front view of a printer according to a second embodiment of the present invention.

In a printer 201 according to another embodiment of the present invention, as illustrated in FIG. 12, a position of a grip portion 282 of the paper feed tray 20 is shifted to a right side.

Similar to the first embodiment (see FIG. 4), a center position of the grip portion 81 of the paper feed tray 10 in the left-right direction D2 coincides with a center position O1 of the paper feed tray 10 in the left-right direction D2. On the other hand, a center position of the grip portion 282 of the paper feed tray 20 in the left-right direction D2 does not coincide with a center position O2 of the paper feed tray 20 in the left-right direction D2, and is on a right side of the center position O2.

The center position of the grip portion 282 in the left-right direction D2 coincides with a center position O of a support region A of rolled paper R or cut paper Pc accommodated in the paper feed tray 20. For example, a length in the left-right direction D2 of the rolled paper R and the cut paper Pc accommodated in the paper feed tray 20 is substantially half a width of the paper feed tray 20 (a length thereof in the left-right direction D2), and the rolled paper accommodating portion 21 and the support surface 62*a* constituting the support region A are provided in a substantially right half region of the paper feed tray 20. Alternatively, the rolled paper accommodating portion 21 and the support surface 62*a* may be provided over the entire width of the paper feed tray 20, and a substantially right half region of the rolled paper accommodating portion 21 and the support surface 62*a* may be set as the support region A. In this case, the center position O of the support region A in the left-right direction D2 is different from the center position O2 of the paper feed tray 20 in the left-right direction D2, and is on the right side of the center position O2.

As described above, according to the present embodiment, the center position of the grip portion 282 in the left-right direction D2 is different from the center position of the grip portion 81 in the left-right direction D2. The center position of the grip portion 282 in the left-right direction D2 is shifted, from the center position O2 of the paper feed tray 20 in the left-right direction D2, in a direction toward the center position O of the support region A in the left-right direction D2. In this case, since the grip portion 282 is provided at a position corresponding to a center of gravity of the paper P supported in the paper feed tray 20, it is possible to easily perform an operation on the paper feed tray 20 (such as moving work with respect to the housing 1*a*).

Figure 13:
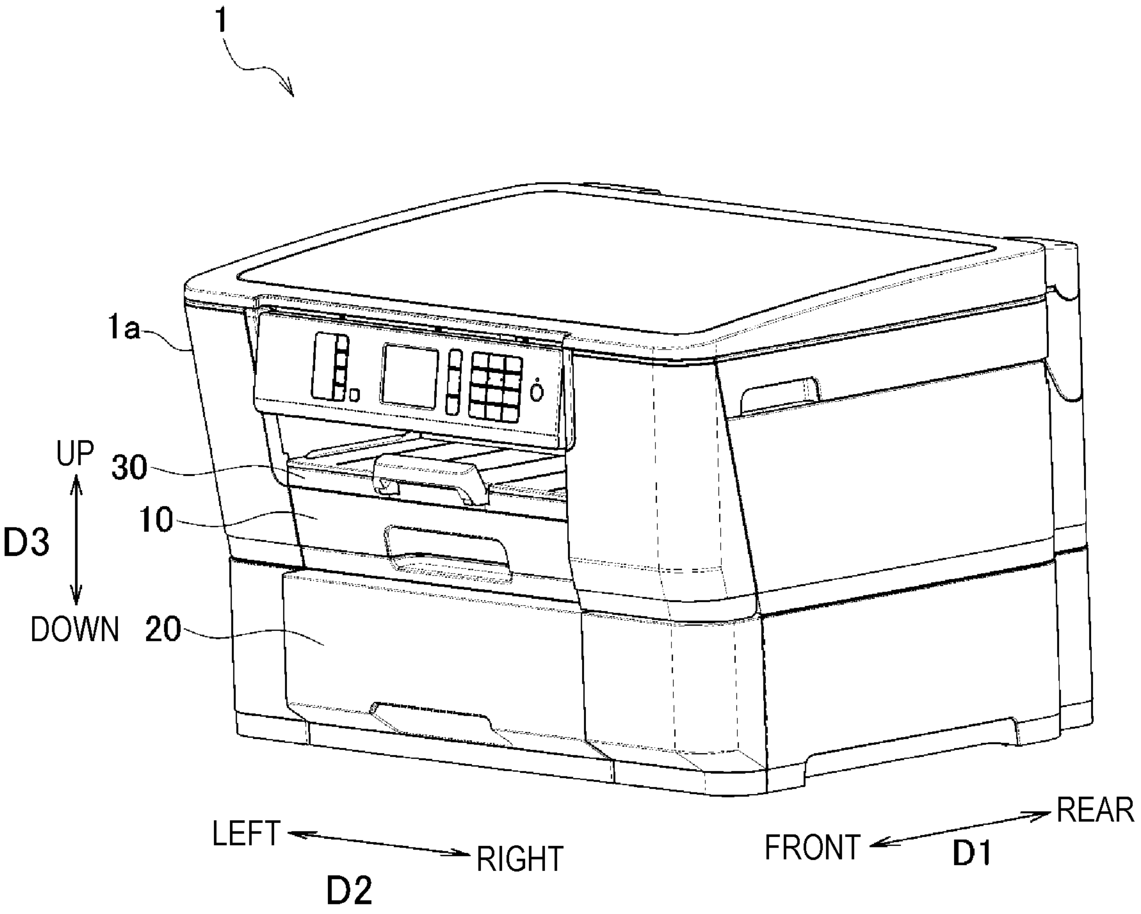
FIG. 13 is a perspective view of the printer according to the present invention.

As illustrated in FIG. 13, the printer 1 (image recording apparatus) according to another embodiment of the present invention includes the housing 1*a*, the paper feed trays 10 and 20 that are attachable to and detachable from the housing 1*a*, and the paper discharge tray 30. The paper feed tray 10 corresponds to the "first tray" of the present invention, and the paper feed tray 20 corresponds to the "second tray" of the present invention.

The paper feed trays 10 and 20 each have a box shape opening to an upper side, and are movable in a front-rear direction D1 (a first direction) with respect to the housing 1*a*. The paper feed trays 10 and 20 are pulled out from the housing 1*a* by being moved forward (to an upstream side in the front-rear direction D1) with respect to the housing 1*a*, and are attached to the housing 1*a* by being moved rearward (to a downstream side in the front-rear direction D1) with respect to the housing 1*a*. The paper feed trays 10 and 20 may take an attached position (see FIG. 13) where the paper feed trays 10 and 20 are attached to the housing 1*a* and a drawn-out position (not illustrated) forward (at the upstream side in the front-rear direction D1) of the attached position. When the paper feed trays 10 and 20 are in the attached position, the paper feed tray 20 overlaps the paper feed tray 10 in an up-down direction D3 (a second direction) and is disposed below the paper feed tray 10.

The paper feed trays 10 and 20 and the paper discharge tray 30 have substantially the same width (a length in a left-right direction D2 (a fourth direction)). A height of the paper feed tray 20 (length in the up-down direction D3) is larger than a height of the paper feed tray 10.

Figure 14:
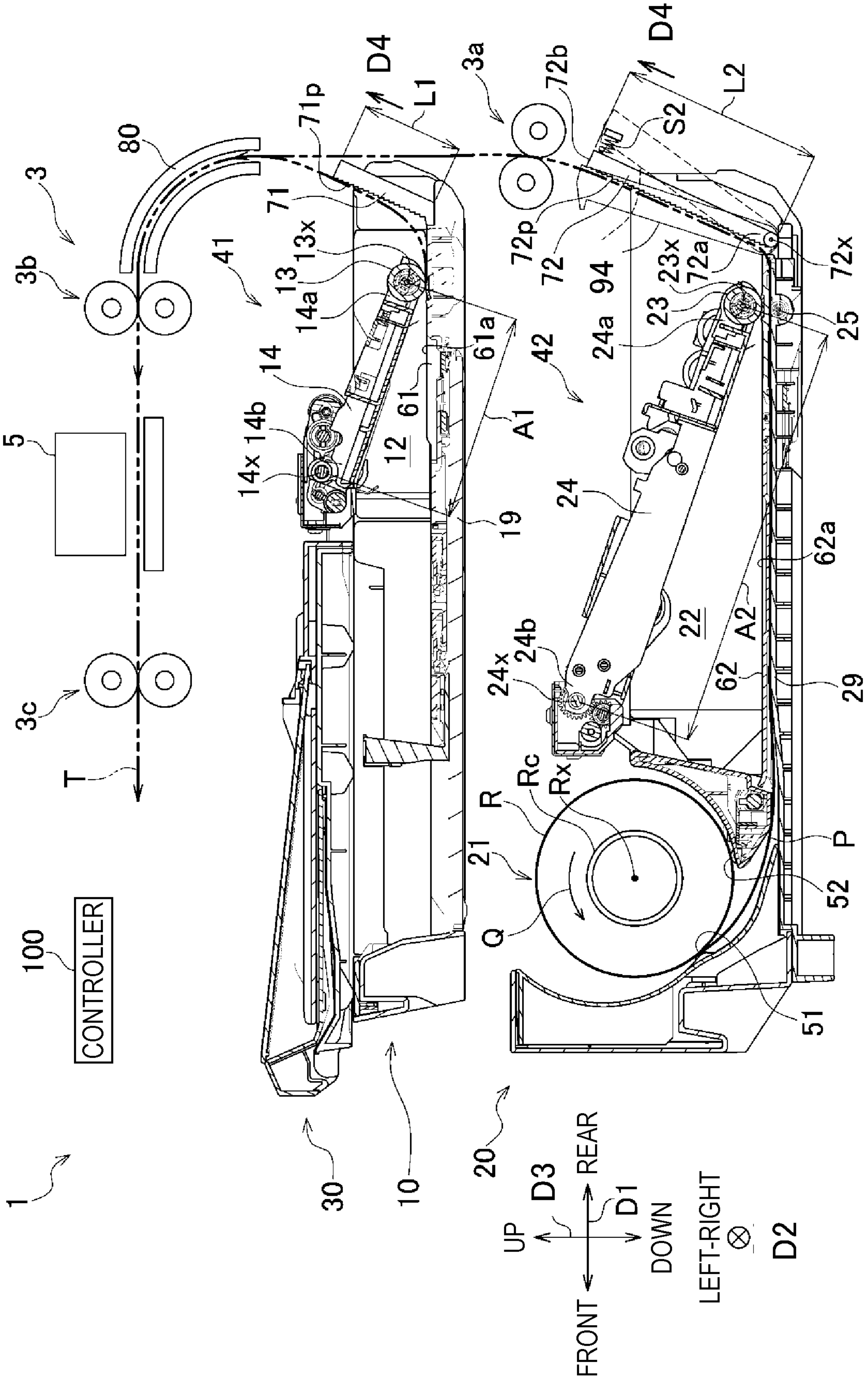
FIG. 14 is a schematic side view illustrating an internal structure of the printer in FIG. 13.
Figure 15:
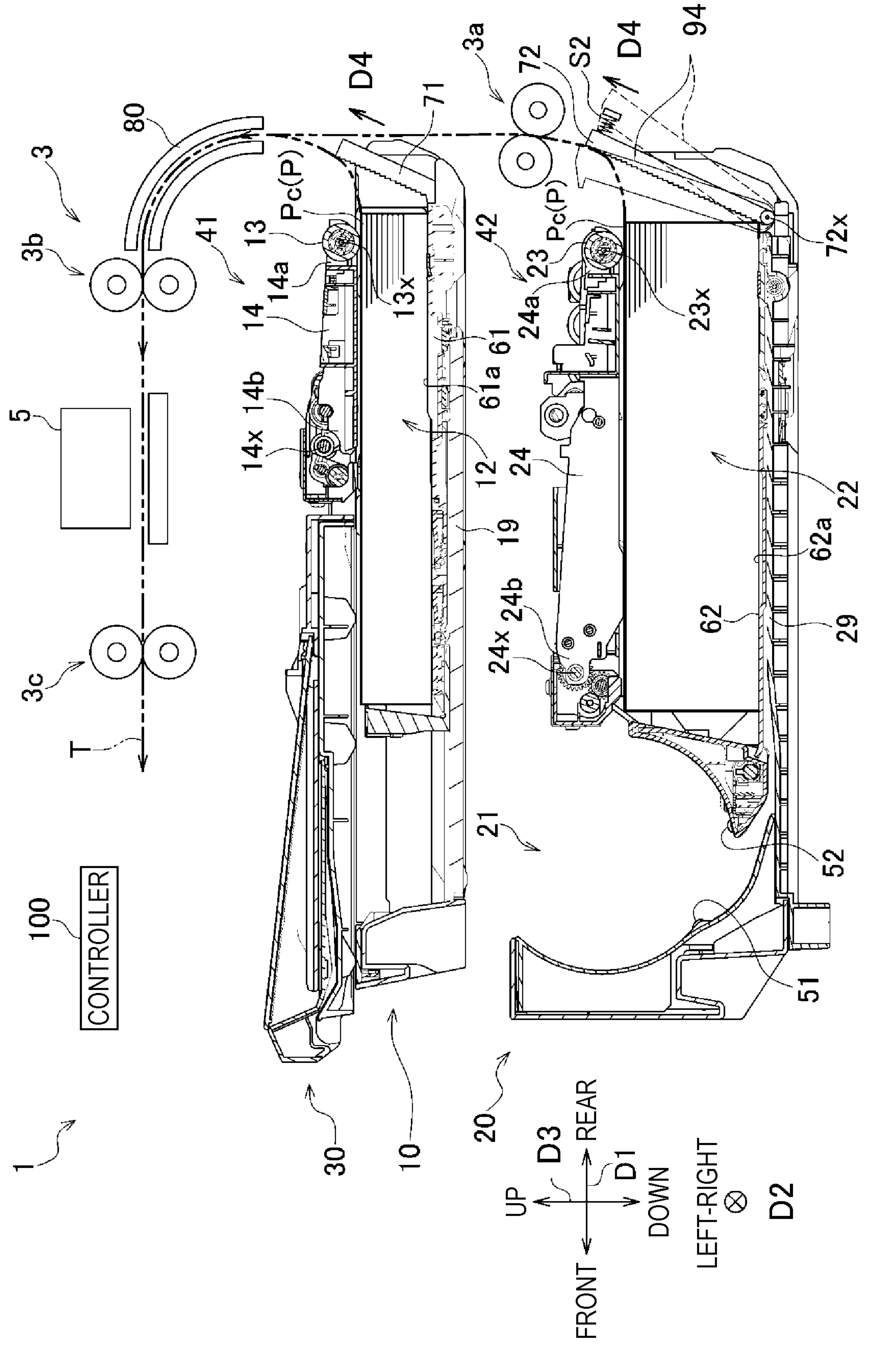
FIG. 15 is a schematic side view corresponding to FIG. 14, illustrating a state where a maximum number of sheets of cut paper are accommodated in each paper feed tray in the printer in FIG. 13.

As illustrated in FIGS. 14 and 15, the printer 1 further includes the conveying mechanism 3, the head 5, and the control unit 100. Elements of the conveying mechanism 3 other than the rollers 51 and 52, which will be described later, the head 5, and the control unit 100 are supported by the housing 1*a*.

The conveying mechanism 3 is configured to selectively convey paper P from the paper feed trays 10 and 20, and includes the rollers 51 and 52, the rollers 13 and 23, the arms 14 and 24, the roller pairs 3*a* to 3*c*, the separating members 71 and 72, the pair of guide members 80, and a conveyance motor (not illustrated) for driving the rollers. The paper P in each of the paper feed trays 10 and 20 is conveyed by the conveying mechanism 3 along a conveyance path T that passes between the pair of guide members 80, below the head 5, and toward the paper discharge tray 30.

In the conveying mechanism 3, the roller 13 and the arm 14 constitute the feeding mechanism 41 capable of feeding the paper P accommodated in the paper feed tray 10. In the conveying mechanism 3, the rollers 51 and 52, the roller 23, and the arm 24 constitute the feeding mechanism 42 capable of feeding the paper P accommodated in the paper feed tray 20. The feeding mechanism 41 corresponds to a "first feeding mechanism" of the present invention, and the feeding mechanism 42 corresponds to a "second feeding mechanism" of the present invention.

The paper P is a general term of the paper P unwound from rolled paper R described later and cut paper Pc, and corresponds to the "sheet medium" of the present invention. The cut paper Pc is paper P having a shorter length along the conveyance path T than the paper P constituting the rolled paper R.

The paper feed tray 10 includes the cut paper accommodating portion 12 capable of accommodating a plurality of sheets of cut paper Pc (see FIG. 15) stacked in the up-down direction D3. The cut paper Pc accommodated in the cut paper accommodating portion 12 is supported on the upper surface 61*a* (corresponding to a "support surface" of the present invention) of the support plate 61 disposed along the bottom plate 19 of the paper feed tray 10.

The roller 13 (corresponding to the "first roller" of the present invention) is supported by the one end 14*a* of the arm 14 (corresponding to the "first arm" of the present invention) and is rotatable about the shaft 13*x* extending along the left-right direction D2. The other end 14*b* of the arm 14 is supported by the housing 1*a* (see FIG. 13) via the shaft 14*x* extending along the left-right direction D2. The arm 14 is rotatable about the shaft 14*x* with the other end 14*b* serving as a fulcrum (see FIGS. 14 and 15).

When no cut paper Pc is accommodated in the cut paper accommodating portion 12 in a state where the paper feed tray 10 is attached to the housing 1*a*, the roller 13 comes into contact with the upper surface 61*a* of the support plate 61 (see FIG. 14). When the cut paper Pc is accommodated in the cut paper accommodating portion 12 in a state where the paper feed tray 10 is attached to the housing 1*a*, the roller 13 comes into contact with the uppermost sheet of the cut paper Pc accommodated in the cut paper accommodating portion 12 (see FIG. 15). At this time, the conveyance motor performs driving under the control of the control unit 100 to rotate the roller 13, whereby the cut paper Pc is fed from the front (upstream side) toward the rear (downstream side) in the front-rear direction D1.

The cut paper Pc fed from the paper feed tray 10 by the roller 13 comes into contact with the separating member 71, moves along the separating member 71, and is guided to between the pair of guide members 80.

The separating member 71 (corresponding to the "first separating member" of the present invention) is disposed at a rear side (downstream side in the front-rear direction D1) of the roller 13. The separating member 71 extends in an oblique direction D4 (a third direction) intersecting both the front-rear direction D1 and the up-down direction D3. In other words, the separating member 71 is inclined so as to be positioned higher while going toward the rear side. On a front surface of the separating member 71 that defines the conveyance path T (that is, a front surface with which the paper P comes into contact), an uneven portion 71*p* formed of a fine unevenness repeating along the oblique direction D4 is provided. With the uneven portion 71*p*, multi-feed (a phenomenon where a plurality of sheets of cut paper Pc are conveyed in an overlapped state) is prevented. That is, the separating member 71 has a function of separating the cut paper Pc contacting the roller 13 from the other sheets of cut paper Pc.

The uneven portion 71*p* is provided in a region extending in the oblique direction D4 on the front surface of the separating member 71, similarly to an uneven portion 72*p* (see FIG. 16) provided on a front surface of the separating member 72 described later. However, while the separating member 72 is provided with two uneven portions 72*p*, the separating member 71 is provided with one uneven portion 71*p*. While the uneven portion 71*p* is made of metal, the uneven portion 72*p* is made of resin. That is, while the uneven portion 71*p* has a protrusion made of metal, the uneven portion 72*p* has a protrusion made of resin and does not have a protrusion made of metal.

The paper feed tray 20 includes the rolled paper accommodating portion 21 capable of accommodating the rolled paper R (see FIG. 14), and the cut paper accommodating portion 22 capable of accommodating a plurality of sheets of cut paper Pc (see FIG. 15) stacked in the up-down direction D3. The cut paper Pc accommodated in the cut paper accommodating portion 22 is supported on the upper surface 62*a* (corresponding to the "support surface" of the present invention) of the support plate 62 disposed along the bottom plate 29 of the paper feed tray 20.

In the paper feed tray 20, when the rolled paper R is used, the cut paper Pc is removed from the cut paper accommodating portion 22 (see FIG. 14), and when the cut paper Pc is used, the rolled paper R is removed from the rolled paper accommodating portion 21 (see FIG. 15). The cut paper accommodating portion 22 is a space behind the rolled paper accommodating portion 21.

The number of sheets of cut paper Pc that may be accommodated in the cut paper accommodating portion 22 is larger than the number of sheets of cut paper Pc that may be accommodated in the cut paper accommodating portion 12.

The roller 23 (corresponding to the "second roller" of the present invention) is supported by the one end 24*a* of the arm 24 (corresponding to the "second arm" of the present invention) and is rotatable about the shaft 23*x* extending along the left-right direction D2. The other end 24*b* of the arm 24 is supported by the housing 1*a* (see FIG. 13) via the shaft 24*x* extending along the left-right direction D2. The arm 24 is rotatable about the shaft 24*x* with the other end 24*b* serving as a fulcrum (see FIGS. 14 and 15).

Here, a length of the arm 24 (a length from the other end 24*b* to the one end 24*a*) is longer than a length of the arm 14 (a length from the other end 14*b* to the one end 14*a*). A length A2 from the other end 24*b* of the arm 24 to a position where the roller 23 contacts the paper P is longer than a length A1 from the other end 14*b* of the arm 14 to a position where the roller 13 contacts the paper P (see FIG. 14).

When no cut paper Pc is accommodated in the cut paper accommodating portion 22 in a state where the paper feed tray 20 is attached to the housing 1*a*, the roller 23 comes into contact with the upper surface 62*a* of the support plate 62 (see FIG. 14). When the cut paper Pc is accommodated in the cut paper accommodating portion 22 in a state where the paper feed tray 20 is attached to the housing 1*a*, the roller 23 comes into contact with the uppermost sheet of the cut paper Pc accommodated in the cut paper accommodating portion 22 (see FIG. 15). At this time, the conveyance motor performs driving under the control of the control unit 100 to rotate the roller 23, whereby the cut paper Pc is fed from the front (upstream side) toward the rear (downstream side) in the front-rear direction D1.

The rolled paper R is obtained by winding a long sheet of paper Pin a roll shape around an outer circumferential surface of a cylindrical core member Rc, and corresponds to the "roll body" of the present invention. The rolled paper R is accommodated in the rolled paper accommodating portion 21 in a state where a rotation axis Rx (a center axis of the core member Rc) is along the left-right direction D2.

The rollers 51 and 52 are disposed at a bottom portion of the rolled paper accommodating portion 21. The rollers 51 and 52 are rotatable about an axis extending in the left-right direction D2. When the rolled paper R is accommodated in the rolled paper accommodating portion 21, an outer circumferential surface of a lower portion of the rolled paper R is supported by the rollers 51 and 52. When setting the rolled paper R, the rolled paper R is manually rotated in an arrow direction Q in FIG. 14, and the paper P is unrolled from the rolled paper R. The paper P is passed through a gap between a lower surface of the support plate 62 and an upper surface of the bottom plate 29, and a leading end of the paper P is sandwiched between the roller 23 and the roller 25. In this state, the conveyance motor performs driving under the control of the control unit 100 to rotate the rollers 51, 52, and 23, whereby the paper P unwound from the rolled paper R is fed from the front (upstream side) toward the rear (downstream side) in the front-rear direction D1.

The paper P fed by the roller 23 from the paper feed tray 20 (the paper P unwound from the rolled paper R accommodated in the rolled paper accommodating portion 21, or the cut paper Pc accommodated in the cut paper accommodating portion 22) comes into contact with the separating member 72, moves along the separating member 72, and is guided to the roller pair 3*a*.

The separating member 72 (corresponding to the "second separating member" of the present invention) is disposed at a rear side (downstream side in the front-rear direction D1) of the roller 23. Similar to the separating member 71, the separating member 72 extends in the oblique direction D4. In other words, the separating member 72 is inclined so as to be positioned higher while going toward the rear side. On a front surface of the separating member 72 that defines the conveyance path T (that is, a front surface with which the paper P comes into contact), the uneven portion 72*p* formed of a fine unevenness repeating along the oblique direction D4 is provided. With the uneven portion 72*p*, multi-feed (a phenomenon where a plurality of sheets of cut paper Pc are conveyed in an overlapped state) is prevented. That is, the separating member 72 has a function of separating the cut paper Pc contacting the roller 23 from the other sheets of cut paper Pc.

A length L2 of the separating member 72 in the oblique direction D4 is longer than a length L1 of the separating member 71 in the oblique direction D4 (see FIG. 14). While the separating member 71 is fixed, the separating member 72 is rotatable. Specifically, the separating member 72 is rotatable about a rotation shaft 72*x* that is provided at a lower end 72*a* (one end) and that extends in the left-right direction D2. A coil spring S2 (corresponding to the "urging member" of the present invention) is provided on a back surface (a surface opposite to the front surface) of an upper end 72*b* of the separating member 72. When coming into contact with the paper P fed by the feeding mechanism 42, the separating member 72 rotates about the rotation shaft 72*x* such that the upper end 72*b* moves rearward (to the downstream side in the front-rear direction D1) against an urging force of the coil spring S2.

A stopper 94 is provided for the paper feed tray 20. The stopper 94 is supported by the housing 1*a* (see FIG. 13) and the separating member 72. The stopper 94 is rotatable about the rotation shaft 72*x*, and may take an advanced position (a position indicated by a solid line in FIG. 14) where the stopper 94 is advanced to the conveyance path T and a retreated position (a position indicated by a broken line in FIG. 14) where the stopper 94 is retreated from the conveyance path T, in accordance with attachment and detachment of the paper feed tray 20 to and from the housing 1*a*. Specifically, the stopper 94 is in the advanced position when the paper feed tray 20 is drawn out from the housing 1*a* (that is, when the paper feed tray 20 is in the drawn-out position). When the paper feed tray 20 moves from the drawn-out position to the attached position (see FIGS. 13 to 15), the stopper 94 moves from the advanced position to the retreated position. Thereafter, when the paper P is conveyed by the conveying mechanism 3 during image recording, the stopper 94 is held in the retreated position.

If the stopper 94 is not provided, when the paper feed tray 20 reaches the attached position and stops, the cut paper Pc (see FIG. 15) in the paper feed tray 20 may move rearward due to inertia and enter a state of riding over the separating member 72. When the cut paper Pc is conveyed in this state, the separating member 72 having a separating function does not appropriately function, and multi-feed may occur. In contrast, in the present embodiment, since the stopper 94 is provided, the cut paper Pc moving rearward due to inertia comes into contact with the stopper 94, and the cut paper Pc may be prevented from riding over the separating member 72 (and thus multi-feed may be avoided).

Figure 16:
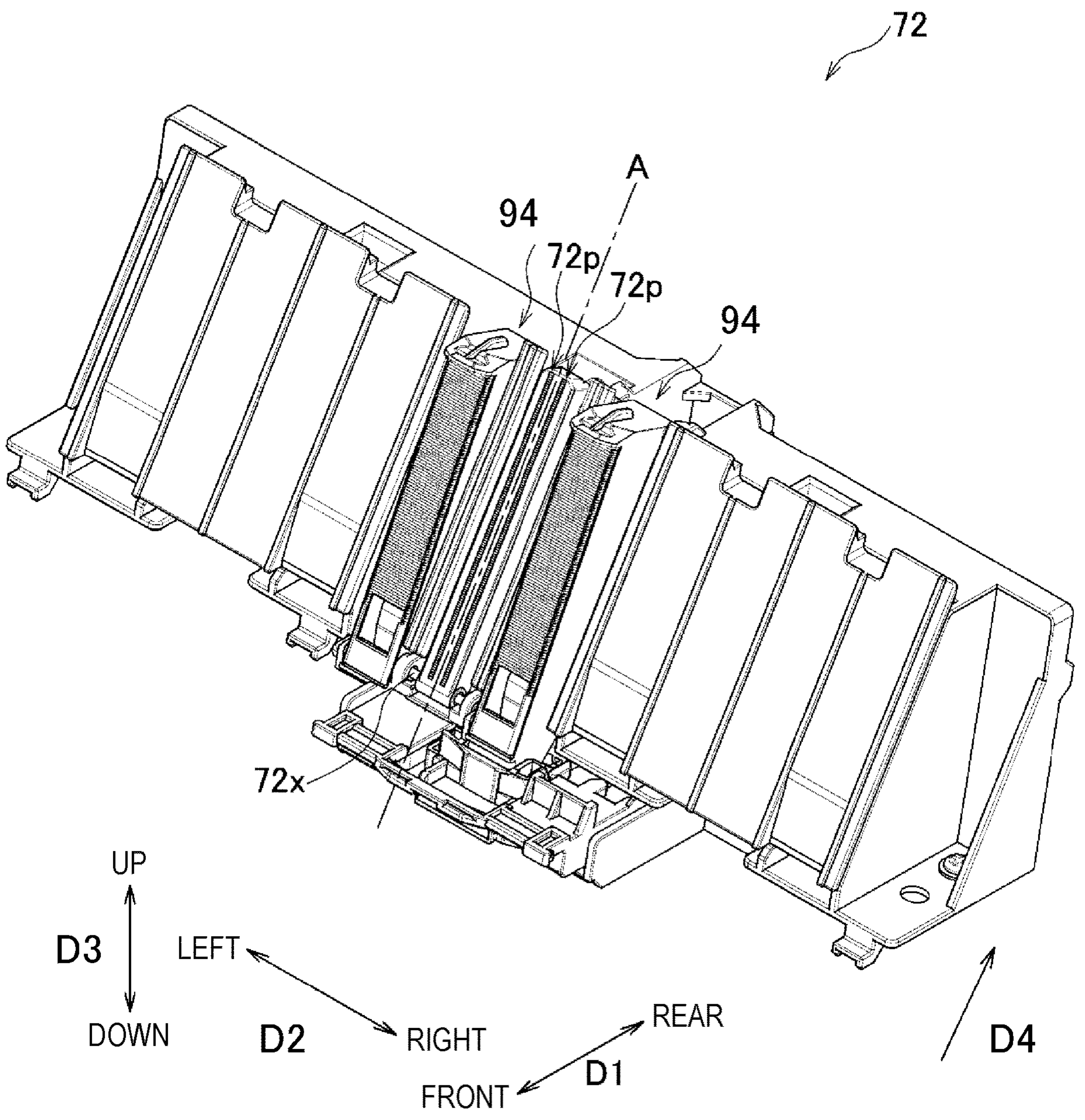
FIG. 16 is a perspective view illustrating a separating member and a stopper provided for a lower paper feed tray provided in the printer in FIG. 13.

As illustrated in FIG. 16, two stoppers 94 are provided. The two stoppers 94 are disposed symmetrically with respect to a virtual straight line A passing through a center of the separating member 72 in the left-right direction D2, and sandwich the uneven portions 72*p* in the left-right direction D2. The uneven portions 72*p* are disposed in the vicinity of the virtual straight line A.

No stopper is provided for the paper feed tray 10.

Figure 17:
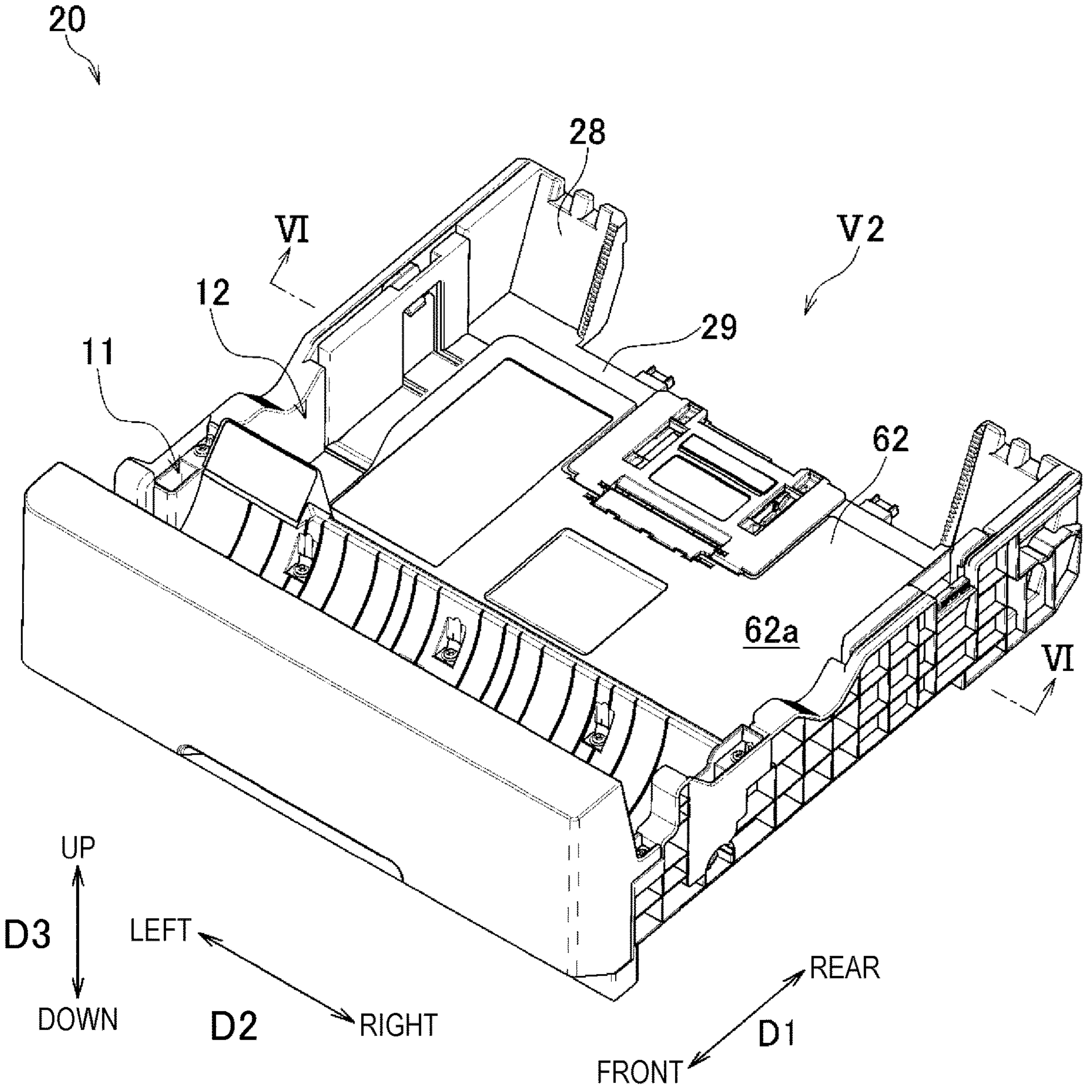
FIG. 17 is a perspective view illustrating the lower paper feed tray provided in the printer in FIG. 13.
Figure 18:
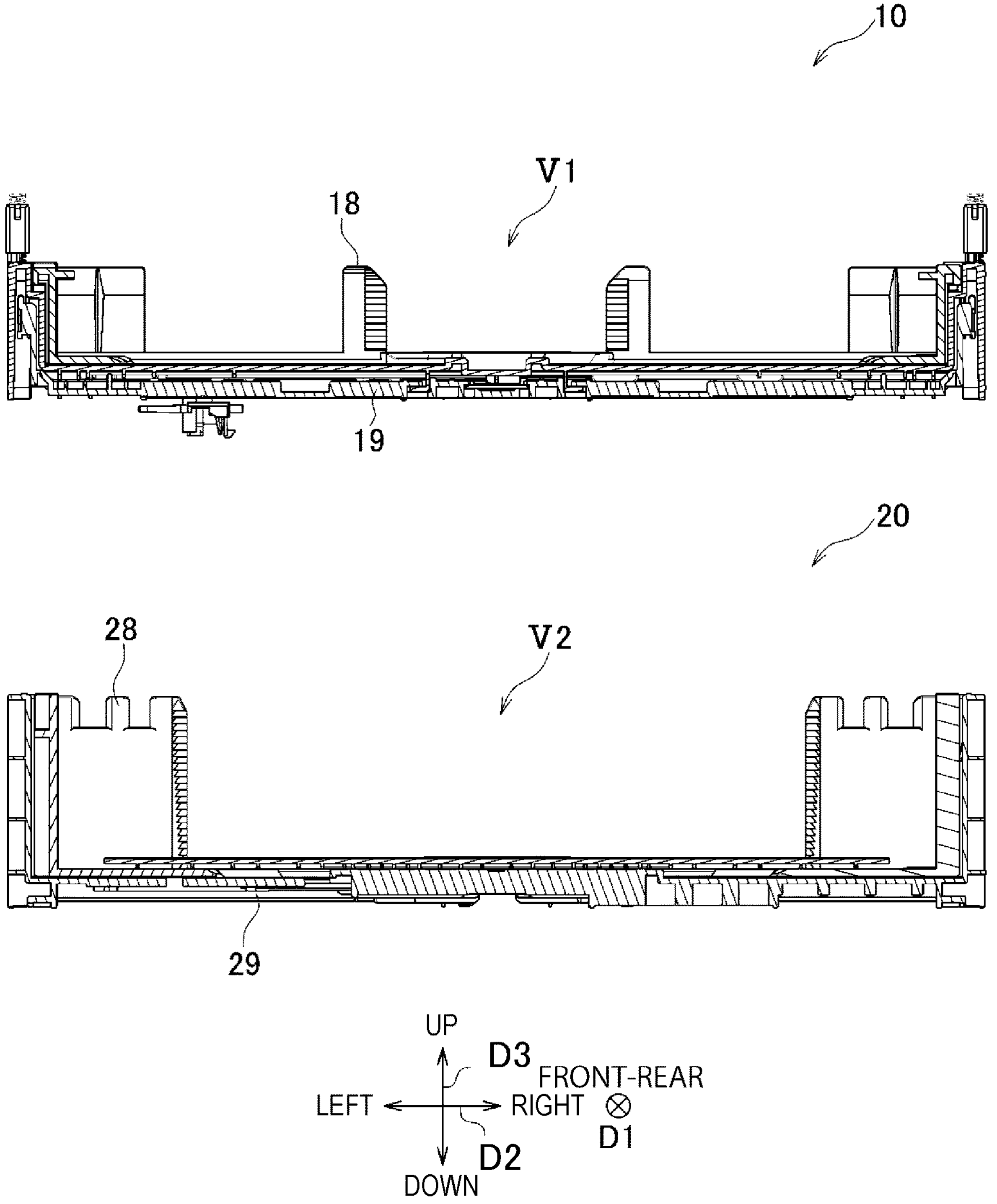
FIG. 18 is a cross-sectional view taken along a line VI-VI in FIG. 17, illustrating two paper feed trays provided in the printer in FIG. 13.

As illustrated in FIGS. 17 and 18, a width (a length in the left-right direction D2) of an opening V2 at a rear end of the paper feed tray 20 is larger than a width of an opening V1 at a rear end of the paper feed tray 10. The opening V1 is a space in which the separating member 71 is disposed when the paper feed tray 10 is in the attached position, and is defined by a rear plate 18 and the bottom plate 19 of the paper feed tray 10. The opening V2 is a space in which the separating member 72 is disposed when the paper feed tray 20 is at the attached position, and is defined by a rear plate 28 and the bottom plate 29 of the paper feed tray 20. By increasing the width of the opening V2 in the paper feed tray 20 having a large maximum accommodation number, it is possible to easily perform work of inserting a large number of sheets of cut paper Pc into the cut paper accommodating portion 22 from the rear side of the paper feed tray 20.

The head 5 (corresponding to the "recording unit" of the present invention) includes a plurality of nozzles (not illustrated) formed on a lower surface thereof and a driver IC. When the paper P conveyed by the conveying mechanism 3 passes through a position facing the lower surface of the head 5, the driver IC is driven under the control of the control unit 100. Accordingly, ink is ejected from the nozzles and lands on the paper P, and an image is recorded on the paper P. The head 5 may be of a line type that ejects ink from the nozzles in a state where a position thereof is fixed, or a serial type that ejects ink from the nozzles while moving in the left-right direction D2.

The control unit 100 is connected to the conveyance motor and the driver IC via an internal bus (not illustrated). The control unit 100 includes a central processing unit (CPU), a read only memory (ROM), and a random access memory (RAM). The ROM stores a program and data for the CPU to perform various type of control. The RAM temporarily stores data used when the CPU executes the program.

As described above, according to the present embodiment, since the length of the separating member 72 in the oblique direction D4 is longer than the length of the separating member 71 in the oblique direction D4, the maximum accommodation number of the paper feed tray 20 is larger than that of the paper feed tray 10 (see FIGS. 14 and 15). With this configuration, the number (two) of stoppers 94 corresponding to the paper feed tray 20 is larger than the number (zero) of stoppers corresponding to the paper feed tray 10 (see FIGS. 14 to 16). In this case, the number of stoppers is reduced in a tray (paper feed tray 10) having a small maximum accommodation number, so that it is possible to prevent an increase in cost and a degradation in a feeding function. In addition, the number of stoppers 94 is increased in a tray (paper feed tray 20) having a large maximum accommodation number, so that it is possible to prevent a degradation in a multi-feed prevention function.

No stopper is provided for the paper feed tray 10 (see FIGS. 14 and 15). In this case, an increase in cost may be avoided more reliably.

The stoppers 94 corresponding to the paper feed tray 20 are disposed symmetrically with respect to the virtual straight line A passing through the center of the separating member 72 in the left-right direction D2 (see FIG. 16). In this case, it is possible to more reliably prevent a degradation in the multi-feed prevention function in the tray (the paper feed tray 20) having a large maximum accommodation number.

While the separating member 71 is fixed, the separating member 72 comes into contact with the paper P fed by the feeding mechanism 42, so that the upper end 72*b* is movable rearward (to the downstream side in the front-rear direction D1) against the urging force of the coil spring S2 (see FIGS. 14 and 15). In a configuration in which the separating member is fixed, resistance applied to the cut paper Pc by the separating member is constant regardless of the accommodation number of the cut paper Pc. In this case, for example, when about a half of the maximum number of sheets of cut paper Pc are accommodated in the paper feed tray, a plurality of sheets of the cut paper Pc conveyed in an overlapped state are separated by the resistance, and multi-feed may be avoided. However, when the maximum number of sheets of cut paper Pc are accommodated in the paper feed tray or when a number of sheets of cut paper Pc close to a minimum number are accommodated, a plurality of sheets of cut paper Pc conveyed in an overlapped state may be unable to be separated by the resistance, and multi-feed may be unable to be prevented. On the other hand, in a configuration in which the separating member moves against an urging force, the resistance applied to the cut paper Pc by the separating member changes according to the accommodation number of the cut paper Pc, and multi-feed may be avoided by the resistance. Therefore, in the present embodiment, the separating member 71 is fixed to the tray (the paper feed tray 10) having a small maximum accommodation number, so that it is possible to avoid complication of the mechanism and prevent an increase in cost. With the configuration in which the separating member 72 moves against the urging force in the tray (the paper feed tray 20) having a large maximum accommodation number, it is possible to prevent a degradation in the multi-feed prevention function. In addition, in the configuration in which the separating member 71 is fixed, since the resistance applied to the cut paper Pc by the separating member 71 is constant regardless of stiffness of the cut paper Pc (which may change according to thickness and environmental humidity), multi-feed may occur depending on a magnitude of the stiffness. In contrast, in the configuration in which the separating member 72 moves against the urging force, the resistance applied to the cut paper Pc by the separating member 72 is changed by the urging force corresponding to the magnitude of the stiffness (a large urging force applied when the magnitude of the stiffness is high, or a small urging force applied when the magnitude of the stiffness is low), and thus multi-feed is unlikely to occur.

The number (two) of the uneven portions 72*p* corresponding to the separating member 72 is larger than the number (one) of the uneven portions 71*p* corresponding to the separating member 71. In this case, the number of uneven portions 71*p* is reduced in a tray (paper feed tray 10) having a small maximum accommodation number, so that it is possible to prevent an increase in cost and a degradation in the feeding function. In addition, the number of uneven portions 72*p* is increased in a tray (paper feed tray 20) having a large maximum accommodation number, so that it is possible to prevent a degradation in the multi-feed prevention function.

The uneven portion 71*p* corresponding to the separating member 71 has a protrusion made of metal, and the uneven portions 72*p* corresponding to the separating member 72 have a protrusion made of resin and do not have a protrusion made of metal. Since the number of uneven portions 72*p* corresponding to the separating member 72 is larger, it is possible to prevent a degradation in the multi-feed prevention function as long as the uneven portions 72*p* have a protrusion made of resin even without a protrusion made of metal. Further, since the protrusion is made of resin instead of metal, an increase in cost may be further prevented.

The feeding mechanisms 41 and 42 are an arm feeding system involving rotation of the arms 14 and 24 (see FIGS. 14 and 15). For example, in a case where the feeding mechanism is a pressure plate lifting-lowering system (a system in which a pressure plate supporting the cut paper Pc is urged upward by an urging member and the pressure plate is lifted and lowered according to an accommodation number of the cut paper Pc), a position in the up-down direction D3 of a force from the cut paper Pc that acts on the separating members 71 and 72 is constant in a process from a state where the maximum number of sheets of cut paper Pc are accommodated in the paper feed tray to a state where the minimum number of sheets of cut paper Pc are accommodated therein. In contrast, when the feeding mechanisms 41 and 42 are an arm feeding system as in the present embodiment, the position in the up-down direction D3 of the force from the cut paper Pc that acts on the separating members 71 and 72 changes in the process from the state where the maximum number of sheets of cut paper Pc are accommodated in the paper feed trays 10 and 20 to the state where the minimum number of sheets of cut paper Pc are accommodated therein. In this case, depending on the position in the up-down direction D3 of the force from the cut paper Pc, the separating members 71 and 72 having a separating function do not appropriately function, and the multi-feed prevention function may degrade. In particular, in the paper feed tray 20 having a large maximum accommodation number of the cut paper Pc, a change in the position is large, and thus this problem may be remarkable. Therefore, in the present embodiment, the stopper 94 is provided for the paper feed tray 20, the separating member 72 corresponding to the paper feed tray 20 is movable, and the number of uneven portions 72*p* of the separating member 72 corresponding to the paper feed tray 20 is increased, so that it is possible to prevent a degradation in the multi-feed prevention function.

The separating member 72 does not slide in the front-rear direction D1, but rotates about the rotation shaft 72*x* extending along the left-right direction D2. Since the feeding mechanisms 41 and 42 are an arm feeding system as described above, in the case where the position in the up-down direction D3 of the force from the cut paper Pc that acts on the separating members 71 and 72 changes in the process from the state where the maximum number of sheets of the cut paper Pc are accommodated in the paper feed trays 10 and 20 to the state where the minimum number of sheets of cut paper Pc are accommodated therein, in the configuration in which the separating member slides, if the maximum accommodation number is large, a change in the position in the second direction of the force increases in the process from the state where the maximum number of sheets of cut paper Pc are accommodated in the paper feed trays to the state where the minimum number of sheets of cut paper Pc are accommodated therein. Therefore, it may be unable to prevent multi-feed. For example, when about a half of the maximum number of sheets of cut paper Pc are accommodated in the paper feed tray, the separating member slides by the force, and the multi-feed may be avoided. However, when the maximum number of sheets of cut paper Pc are accommodated in the paper feed tray or when the minimum number of sheets of cut paper Pc are accommodated, the separating member may not slide by the force, or a sliding amount may be small even if the separating member slides by the force, and it may be unable to prevent the multi-feed. On the other hand, in the configuration in which the separating member rotates, even if the force changes in the second direction, the separating member rotates and the multi-feed may be avoided.

The paper feed trays 10 and 20 overlap in the up-down direction D3 (see FIGS. 14 and 15). In this case, an increase in size of the printer 1 as viewed in the up-down direction D3 may be avoided.

Figure 19:
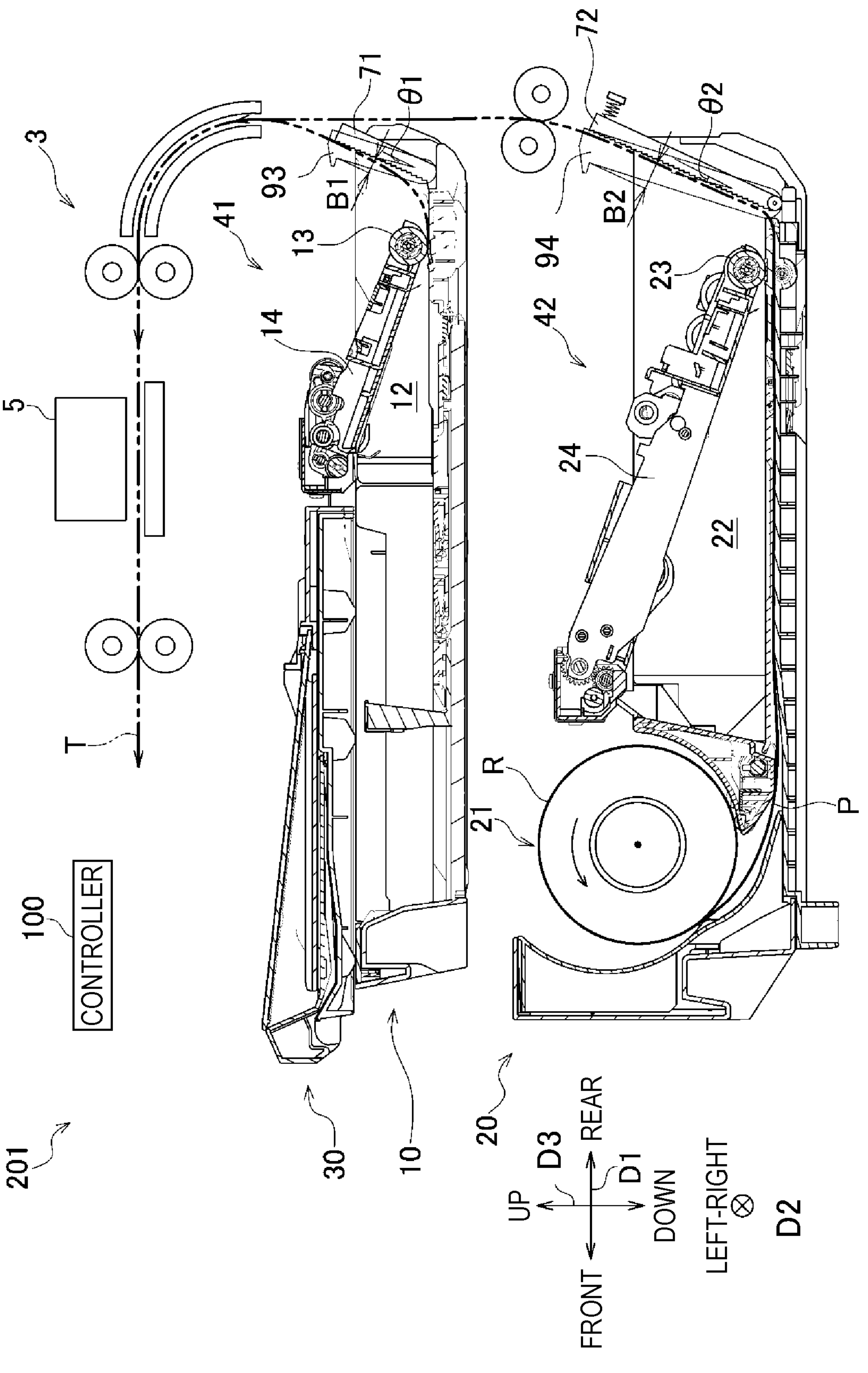
FIG. 19 is a schematic side view corresponding to FIG. 14, illustrating another printer of the present invention.

As illustrated in FIG. 19, the printer 201 according to another embodiment of the present invention includes not only the stopper 94 corresponding to the paper feed tray 20 but also a stopper 93 corresponding to the paper feed tray 10. The stopper 93 corresponds to a "first stopper" of the present invention, and the stopper 94 corresponds to a "second stopper" of the present invention.

The stopper 93 is supported by the housing 1*a* (see FIG. 13) and the separating member 71. The stopper 93 is rotatable similarly to the stopper 94, and may take an advanced position (a position illustrated in FIG. 19) where the stopper 93 is advanced to a conveyance path T and a retreated position (not illustrated) where the stopper 93 is retreated from the conveyance path T, in accordance with attachment and detachment of the paper feed tray 10 to and from the housing 1*a*. Specifically, the stopper 93 is in the advanced position when the paper feed tray 10 is drawn out from the housing 1*a* (that is, when the paper feed tray 10 is in the drawn-out position). When the paper feed tray 10 moves from the drawn-out position to the attached position (see FIGS. 13 to 15), the stopper 93 moves from the advanced position to the retreated position. Thereafter, when the paper P is conveyed by the conveying mechanism 3 during image recording, the stopper 93 is held in the retreated position.

An angle θ2 between the stopper 94 in the advanced position and the separating member 72 is larger than an angle θ1 between the stopper 93 in the advanced position and the separating member 71. An advancing amount B2 of the stopper 94 to the conveyance path T in the advanced position is larger than an advancing amount B1 of the stopper 93 to the conveyance path T in the advanced position. The advancing amount is a distance, along a direction orthogonal to the conveyance path T, from the conveyance path T to a surface of the stopper in contact with the paper P.

As described above, according to the present embodiment, it is possible to prevent a degradation in multi-feed prevention function by increasing the advancing amount B2 of the stopper 94 in the tray (paper feed tray 20) having a large maximum accommodation number.

Figure 20:
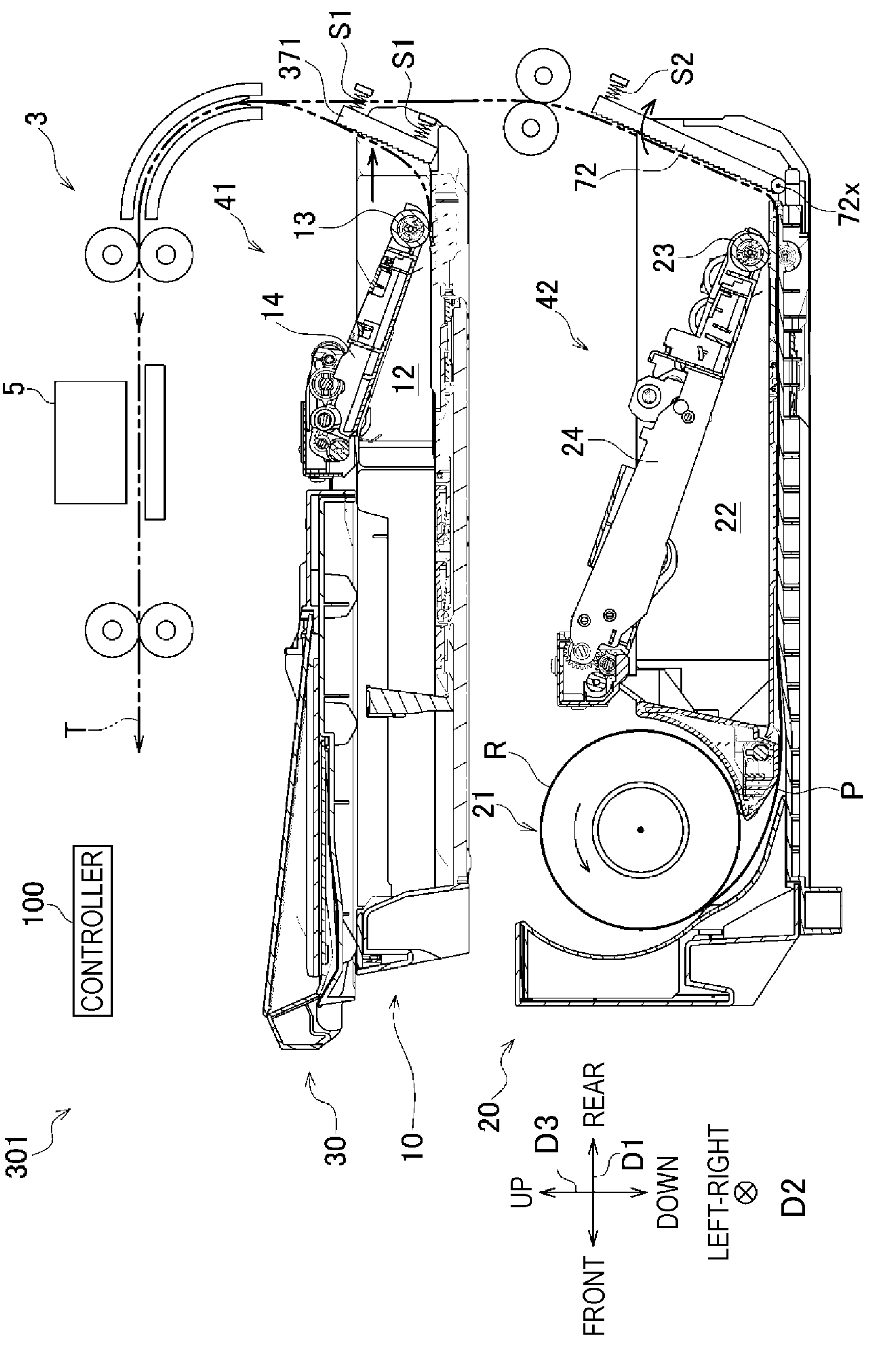
FIG. 20 is a schematic side view corresponding to FIG. 14, illustrating another printer of the present invention.

As illustrated in FIG. 20, in a printer 301 according to another embodiment of the present invention, a separating member 371 corresponding to the paper feed tray 10 is slidable in a front-rear direction D1.

On a back surface of the separating member 371, coil springs S1 are provided at an upper end and a lower end of the separating member 371. When the separating member 371 comes into contact with paper P fed by the feeding mechanism 41, the entire separating member 371 slides so as to move to a downstream side in the front-rear direction D1 against an urging force of the coil springs S1. The coil springs S1 correspond to a "first urging member" of the present invention, and the coil spring S2 corresponds to a "second urging member" of the present invention.

In FIG. 20, the stopper 94 is not illustrated.

For example, a case is assumed in which since the feeding mechanisms 41 and 42 are an arm feeding system, a position in an up-down direction D3 of a force from cut paper Pc that acts on the separating members 371 and 72 changes in a process from a state in which the maximum number of sheets of cut paper Pc are accommodated in the paper feed trays 10 and 20 to a state in which the minimum number of sheets of cut paper Pc are accommodated therein. In this case, in a configuration in which the separating member slides, when the maximum accommodation number is large, a change in the position of the force in a second direction is large in the process from the state in which the maximum number of sheets of cut paper Pc are accommodated in the paper feed tray to the state in which the minimum number of sheets of cut paper Pc are accommodated therein. Therefore, it may be unable to prevent multi-feed. For example, when about a half of the maximum number of sheets of cut paper Pc are accommodated in the paper feed tray, the separating member slides by the force, and the multi-feed may be avoided. However, when the maximum number of sheets of cut paper Pc are accommodated in the paper feed tray or when the minimum number of sheets of cut paper Pc are accommodated, the separating member may not slide by the force, or a sliding amount may be small even if the separating member slides by the force, and it may be unable to prevent the multi-feed. On the other hand, in the configuration in which the separating member rotates, even if the force changes in the second direction, the separating member rotates and the multi-feed may be avoided.

Therefore, in the present embodiment, the separating member 371 slides in the tray (the paper feed tray 10) having a small maximum accommodation number, so that it is possible to avoid complication of the mechanism and prevent an increase in cost. With the configuration in which the separating member 72 rotates in the tray (the paper feed tray 20) having a large maximum accommodation number, it is possible to prevent a degradation in the multi-feed prevention function.

Figure 21:
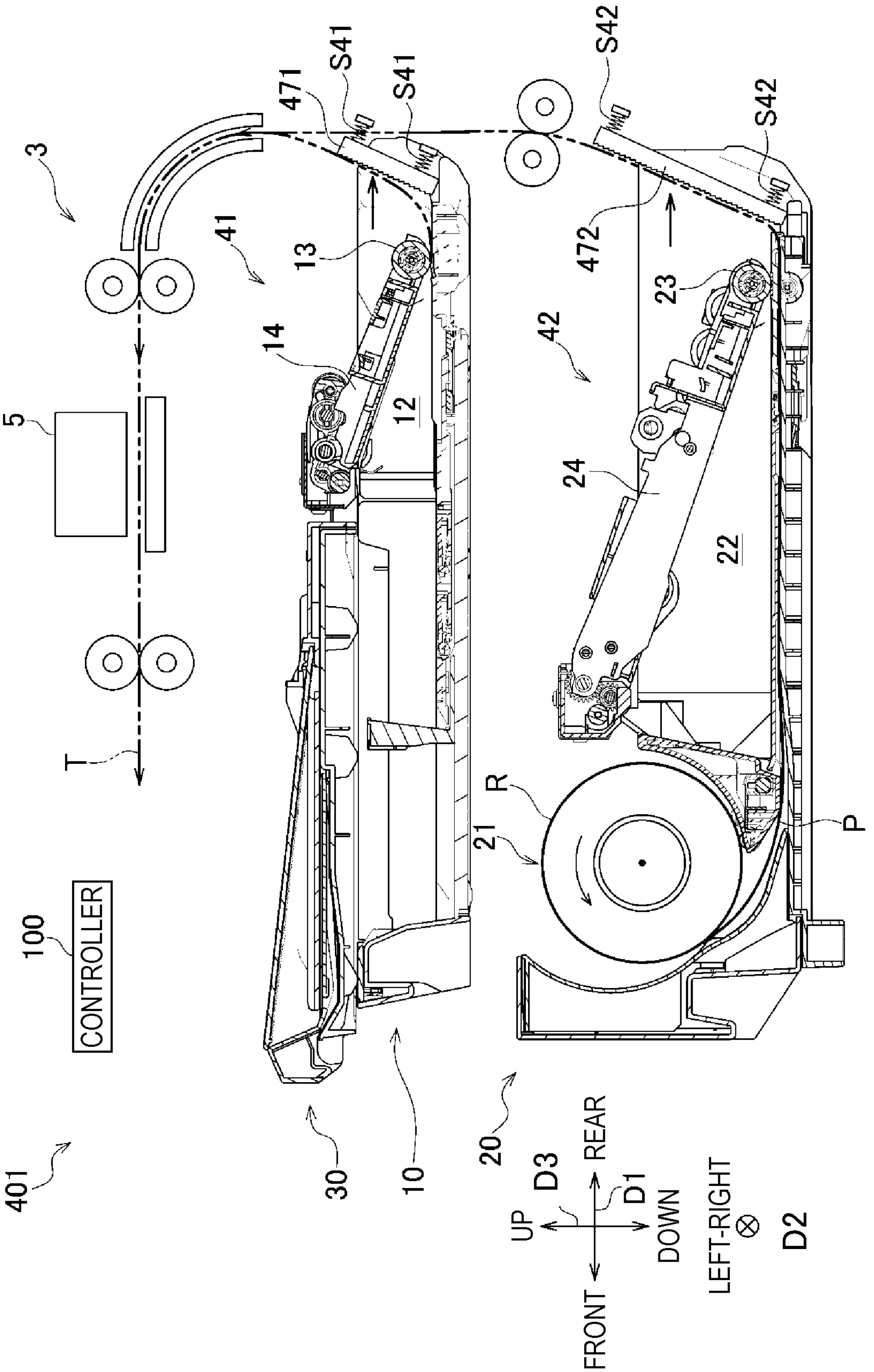
FIG. 21 is a schematic side view corresponding to FIG. 14, illustrating another printer of the present invention.

As illustrated in FIG. 21, in a printer 401 according to another embodiment of the present invention, both a separating member 471 corresponding to the paper feed tray 10 and a separating member 472 corresponding to the paper feed tray 20 are slidable in a front-rear direction D1.

The separating member 471 has the same configuration as the separating member 371 (see FIG. 20) of the third embodiment. On a back surface of the separating member 471, coil springs S41 are provided at an upper end and a lower end of the separating member 471. When the separating member 471 comes into contact with paper P fed by the feeding mechanism 41, the entire separating member 471 slides so as to move to a downstream side in the front-rear direction D1 against an urging force of the coil springs S41.

The separating member 472 has substantially the same configuration as the separating members 371 and 471. On a back surface of the separating member 472, coil springs S42 are provided at an upper end and a lower end of the separating member 472. When the separating member 472 comes into contact with the paper P fed by the feeding mechanism 42, the entire separating member 472 slides so as to move to the downstream side in the front-rear direction D1 against an urging force of the coil springs S42.

The coil springs S41 correspond to the "first urging member" of the present invention, and the coil springs S42 correspond to the "second urging member" of the present invention. The urging force of the coil spring S42 is larger than the urging force of the coil spring S41.

In FIG. 21, the stopper 94 is not illustrated.

As described above, according to the present embodiment, the urging force of the coil spring S41 is reduced in the tray (paper feed tray 10) having a small maximum accommodation number, so that it is possible to prevent an increase in cost and a degradation in a feeding function. In addition, the urging force of the coil spring S42 is increased in the tray (the paper feed tray 20) having a large maximum accommodation number, so that it is possible to prevent a degradation in a multi-feed prevention function.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The paper feed tray 20 may be disposed above the paper feed tray 10.

In order to make the lengths A1 and A2 different from each other, the diameters of the rollers 13 and 23 may be made different.

In the embodiment illustrated in FIG. 2, the rear end 72*b* of the separating member 72 is located at the same position as the rear end 71*b* of the separating member 71 in the front-rear direction. Alternatively, the rear end 72*b* may be located at a position forward (at the upstream side in the front-rear direction D2) of the rear end 71*b* of the separating member 71

The first roller and the second roller are not limited to being supported by the housing, and may be supported by respective trays.

Similarly, the first separating member and the second separating member are not limited to being supported by the housing, and may be supported by respective trays.

The sheet medium is not limited to paper, and may be cloth or a plastic film. That is, the sheet medium may be made of any material as long as the medium is sheet.

The recording unit may eject a liquid other than ink (for example, a treatment liquid for aggregating or precipitating a component in the ink). The recording unit is not limited to a liquid ejection type, and may be a laser type, a heat transfer type, or the like.

The present invention may be applied to a facsimile machine, a copier, a multifunction peripheral, and the like, not limited to a printer.

In the embodiment illustrated in FIG. 12, the center position of the grip portion 282 in the left-right direction D2 may be shifted, from the center position O2 of the paper feed tray 20 in the left-right direction D2, in a direction toward the center position O of the support region A in the left-right direction D2, and may not coincide with the center position O.

In the embodiment illustrated in FIG. 12, when the center position of the support region of the paper feed tray 10 in the left-right direction D2 is different from the center position O1 of the paper feed tray 10 in the left-right direction D2, the center position of the grip portion 81 of the paper feed tray 10 in the left-right direction D2 may be shifted, from the center position O1, in a direction toward the center position of the support region in the left-right direction D2.

Although the grip portion is implemented by a recessed portion formed in the front wall of the tray in the above-described embodiment, the grip portion may be implemented by a U-shaped handle attached to the front wall of the tray, for example, as long as the grip portion may be gripped by a user.

In order to make the lengths A1 and A2 (see FIG. 5) different from each other, the diameters of the rollers 13 and 23 may be made different.

The first roller and the second roller are not limited to being supported by the housing, and may be supported by respective trays. Similarly, the separating members are not limited to being supported by the housing, and may be supported by respective trays.

The present invention is not limited to a configuration in which a pair of side guides spaced apart from each other in the second direction are provided, and a single side guide may be provided.

The feeding mechanism is an arm feeding system involving rotation of the arm in the above-described embodiments, and the present invention is not limited thereto. The feeding mechanism may be a pressure plate lifting-lowering system (a system in which a pressure plate supporting the sheet medium is urged upward by an urging member, and the pressure plate is lifted and lowered according to an accommodation number of the sheet media).

In the embodiment illustrated in FIGS. 14 and 15, the separating member 71 is fixed and the separating member 72 is rotatable. Alternatively, the separating member 71 may be fixed, and the separating member 72 may be slidable in the front-rear direction D1 like the separating member 472 of the fourth embodiment (see FIG. 21).

In the embodiment illustrated in FIG. 16, two stoppers 94 are provided. Alternatively, one stopper 94 may be provided.

In the embodiment illustrated in FIGS. 14 and 15, no stopper is provided for the paper feed tray 10. Alternatively, n (n: natural number) number of stoppers may be provided for the paper feed tray 10, and n+1 or more stoppers may be provided for the paper feed tray.

The stopper is rotatable in the embodiment illustrated in FIGS. 14 and 15, and may be slidable in the first direction.

The number of uneven portions corresponding to the first separating member may be zero.

The first roller and the second roller are not limited to being supported by the housing, and may be supported by respective trays.

Similarly, the first separating member and the second separating member are not limited to being supported by the housing, and may be supported by respective trays.

The feeding mechanism is an arm feeding system involving rotation of the arm in the above-described embodiments, and the present invention is not limited thereto. The feeding mechanism may be a pressure plate lifting-lowering system (a system in which a pressure plate supporting the sheet medium is urged upward by an urging member, and the pressure plate is lifted and lowered according to an accommodation number of the sheet media).

Figure 22:
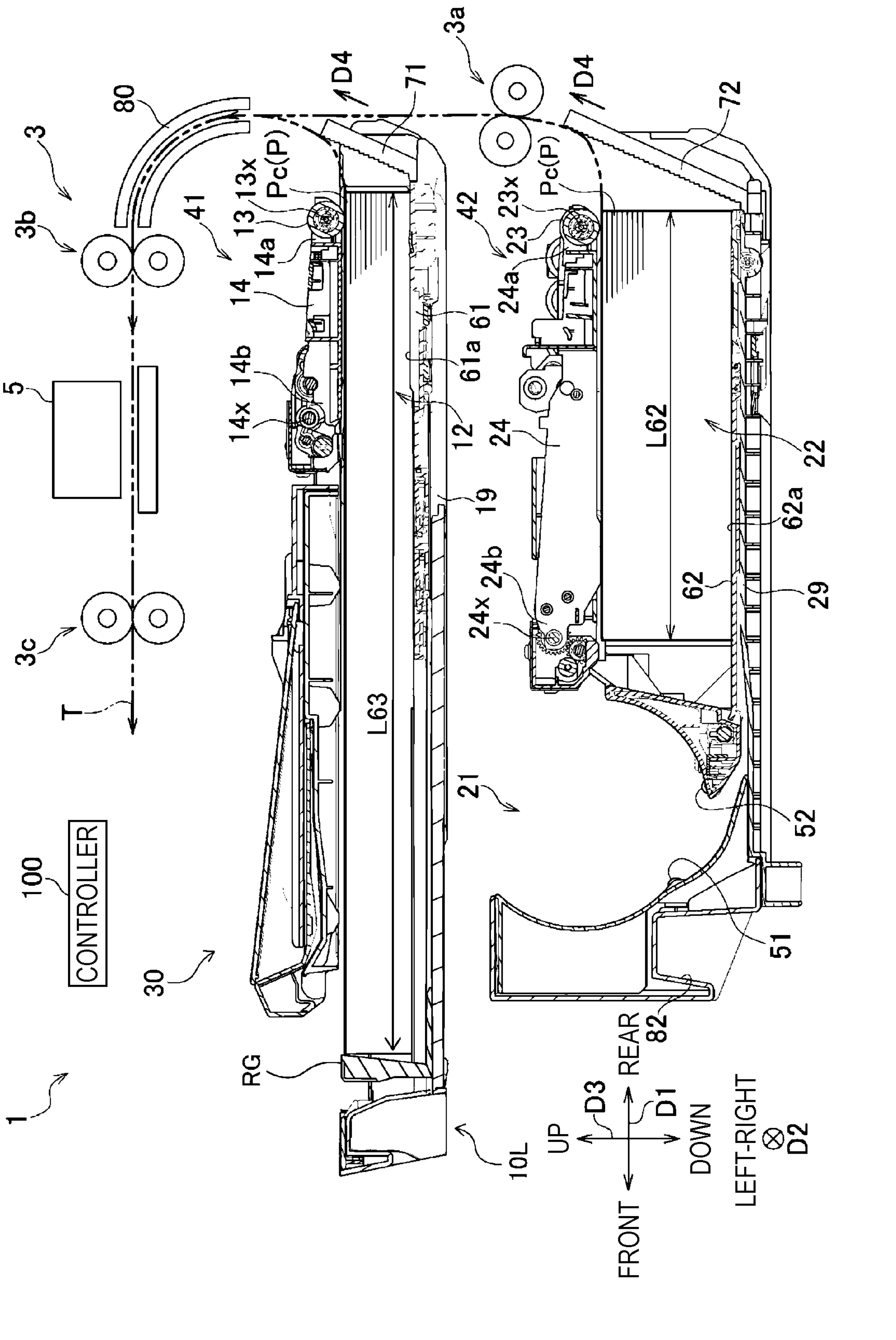
FIG. 22 is a schematic side view of a printer in which an upper feed tray of the printer in FIG. 6 is transformed into an expanded paper feed tray by extending the upper feed tray toward the front direction.
Figure 23:
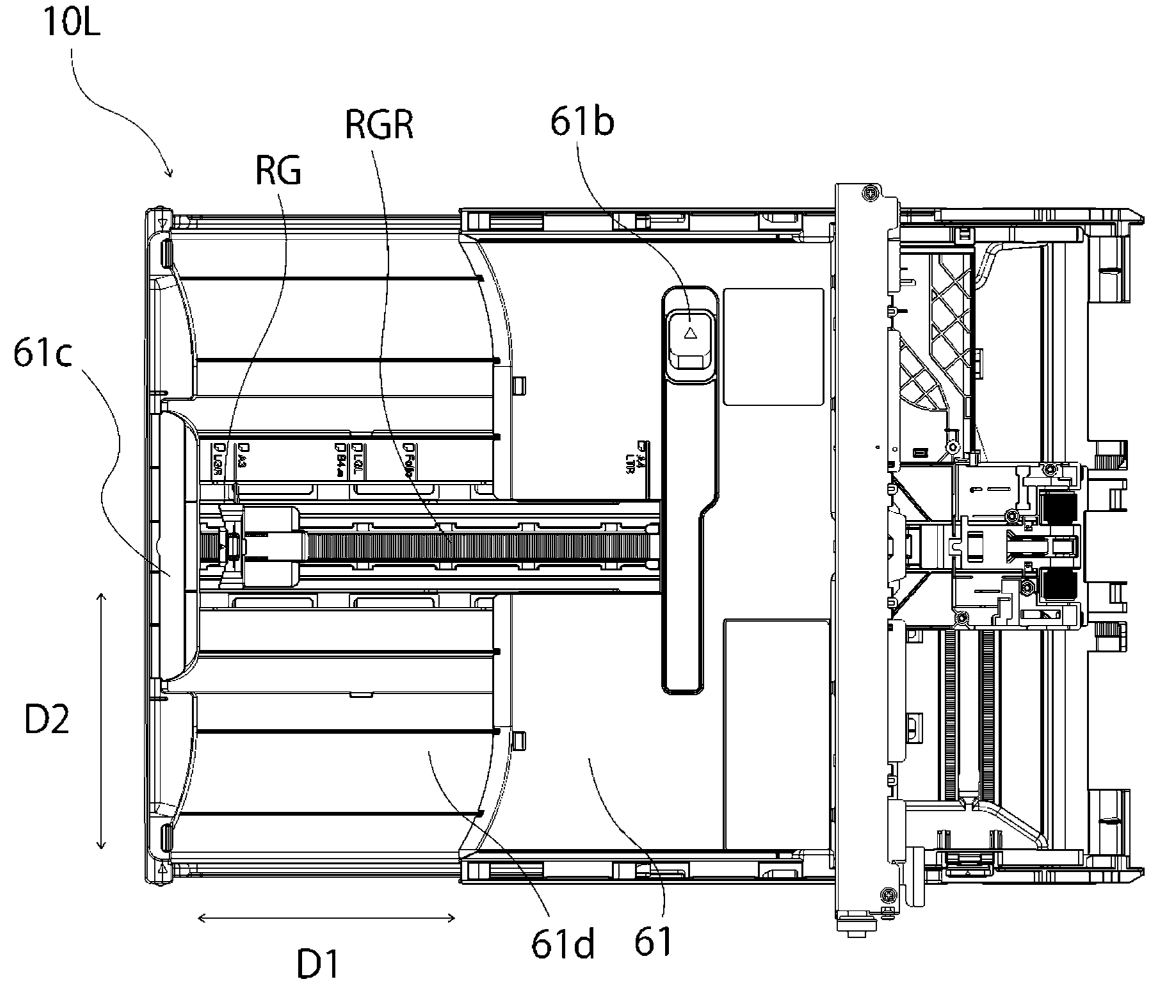
FIG. 23 is a plan view of the expanded tray in FIG. 22.

The paper feed tray 10 may be transformed into an expanded paper feed tray 10L shown in FIGS. 22 and 23. A restriction of drawing of an expand portion 61*d* of the paper feed tray 10 in the front-rear direction D1 is released when an operation portion 61*b* disposed on the support surface 61*a* is moved outward along the left-right direction D2. When a handle portion 61*c* is pulled along the front-rear direction D1 in a state where the restriction is released, a expand portion 61*d* is drawn along the front-rear direction D1 and the paper feed tray 10 is transformed into the expanded paper feed tray 10L. The operation direction of the operation portion 61*b* is an example and is not limited to the outward direction in the left-right direction D2.

The paper feed tray 10 which is not transformed into the expanded paper feed tray 10L is configured to accommodate the cut paper Pc having small size but is not capable of accommodating the cut paper Pc having large size. The expanded paper feed tray 10L is configured to accommodate not only the cut paper having the small size at the lateral arrangement but the cut paper Pc having the large size at the longitudinal arrangement as well. For example, the small size includes A4 size or letter-size and the large size includes A3 size or legal-size.

When the paper feed tray 10 is transformed into the expanded paper feed tray 10L, the rear guide rail RGR is extended. In the expanded paper feed tray 10L, a positioning of the cut paper Pc accommodated in the expanded paper feed tray 10L may be performed by moving the rear guide RG along the rear guide rail RGR and having the rear guide RG be in contact with a front edge of the cut paper Pc having the large size.

The paper feed tray 20 is not capable of accommodating the cut paper Pc having the large size, but is configured to accommodate the cut paper having the small size at the lateral arrangement.

When the expanded paper feed tray 10L is installed in the printer 1 as shown in FIG. 22, the expand portion 61*d* is positioned above the roll paper accommodating portion 21. The printer is configured to accommodate the cut paper Pc having the large size by using a space above the roll paper accommodating portion 21.

A length L63 is a length of the support surface 61*a* of the cut paper accommodating portion 12 of the expanded paper feed tray 10L in the front-rear direction D1. L63 is longer than a sum of the length L62 and a length of the roll paper accommodating portion 21 in the front-rear direction D1.

The image recording apparatus disclosed in the present application may be configured as follows.

[1] An image recording apparatus includes a tray having a support surface, a feeding mechanism configured to feed, in a first direction along the support surface, a sheet media supported on the support surface, a recording unit configured to record an image on the sheet media fed by the feeding mechanism. The tray includes a pair of side walls that sandwich the sheet media supported on the support surface in a second direction, the second direction being substantially orthogonal to the first direction and along the support surface, and a side guide disposed at an inner side of the pair of side walls and configured to contact an end of one of the sheet media in the second direction. The tray includes a first tray and a second tray, and a length of the side guide of the first tray in the first direction and a length of the side guide of the second tray in the first direction are different from each other.

[2] In the image recording apparatus according to [1], the support surface of the first tray is longer in the first direction than the support surface of the second tray, and the length of the side guide of the first tray in the first direction is longer than the length of the side guide of the second tray in the first direction.

[3] In the image recording apparatus according to [2], the second tray includes a first accommodating portion includes the support surface, and a second accommodating portion is configured to accommodate a roll body formed by rolling a sheet medium to have a roll shape.

[4] In the image recording apparatus according to any one of [1] to [3], the feeding mechanism includes a first arm having one end and the other end and rotatable about the other end serving as a fulcrum, a first roller supported by the one end of the first arm and configured to contact an uppermost sheet medium among the sheet media supported on the support surface of the first tray to feed the uppermost sheet medium, a second arm having one end and the other end and rotatable about the other end serving as another fulcrum, and a second roller supported by the one end of the second arm, and configured to contact an uppermost sheet media among a plurality of the sheet media supported on the support surface of the second tray to feed the uppermost sheet medium. A length from the other end of the second arm to a position where the second roller contacts the sheet media is longer than a length from the other end of the first arm to a position where the first roller contacts the sheet media. The length of the side guide of the first tray in the first direction is longer than the length of the side guide of the second tray in the first direction.

[5] In the image recording apparatus according to [4], a length from the other end to the one end of the second arm is longer than a length from the other end to the one end of the first arm.

[6] The image recording apparatus according to [4] or [5] further includes a housing, a first retreating mechanism configured to move the first arm and the first roller to a first retreated position, and a second retreating mechanism configured to move the second arm and the second roller to a second retreated position. The first tray is movable in the first direction with respect to the housing, and is configured to take a first attached position where the first tray is attached to the housing and a first drawn-out position at an upstream side of the first attached position in the first direction. The second tray is movable in the first direction with respect to the housing, and is configured to take a second attached position where the second tray is attached to the housing and a second drawn-out position at an upstream side of the second attached position in the first direction. The first retreating mechanism includes a slide member attached to the first arm, the slide member being slidable along a top surface of the side guide of the first tray while being supported by the side guide when the first tray moves between the first drawn-out position and the first attached position. The second retreating mechanism includes a rotary member attached to the second arm, the rotary member being rotatable along a top surface of the side wall of the second tray while being supported by the side wall when the second tray moves between the second drawn-out position and the second attached position.

[7] In the image recording apparatus according to [6], the number of the rotary members is larger than the number of the slide members.

[8] In the image recording apparatus according to [6] or [7], a length of the side guide of the first tray in the second direction is larger than a length of the side guide of the second tray in the second direction.

[9] In the image recording apparatus according to any one of [6] to [8], the side guide of the first tray is movable in the second direction so as to be able to take a covering position where the side guide covers the side wall of the first tray in a third direction orthogonal to the support surface and a non-covering position where the side guide does not cover the side wall of the first tray in the third direction, and in which when the first tray moves between the first drawn-out position and the first attached position in a state where the side guide of the first tray is disposed in the covering position, the slide member is slidable along a top surface of the side guide of the first tray while being supported by the side guide.

[10] In the image recording apparatus according to any one of [1] to [9], a length of the second tray in a third direction orthogonal to the support surface is longer than a length of the first tray in the third direction, a length of a grip portion of the second tray in the first direction is longer than a length of a grip portion of the first tray in the first direction.

[11] In the image recording apparatus according to any one of [1] to [10], a length of the second tray in a third direction orthogonal to the support surface is longer than a length of the first tray in the third direction, and a length of a grip portion of the second tray in the second direction is longer than a length of a grip portion of the first tray in the second direction.

[12] In the image recording apparatus according to any one of [1] to [11], a length of the second tray in a third direction orthogonal to the support surface is longer than a length of the first tray in the third direction, and a length of a grip portion of the second tray in the third direction is longer than a length of a grip portion of the first tray in the third direction.

[13] In the image recording apparatus according to any one of [1] to [12], a grip portion of the first tray and a grip portion of the second tray have different center positions in the second direction.

[14] In the image recording apparatus according to [13], in at least one of the first tray and the second tray, a center position of a support region of the sheet media on the support surface in the second direction is different from a center position of the tray in the second direction, and the center position of the grip portion of at least one of the trays in the second direction is deviated from the center position of the tray in the second direction, in a direction toward the center position of the support region in the second direction.

[15] An image recording apparatus includes a tray having a support surface, a feeding mechanism configured to feed sheet media supported on the support surface in a first direction along the support surface, and a recording unit configured to record an image on one of the sheet media fed by the feeding mechanism. The tray includes a pair of side walls that sandwich the sheet media supported on the support surface in a second direction, the second direction being orthogonal to the first direction and along the support surface, and a side guide that is disposed at an inner side of the pair of side walls and is configured to contact an end in the second direction of one of the sheet media supported on the support surface. The tray includes a first tray and a second tray. The first tray is configured to support the sheet media in stacked state. The second tray is configured to support a roll body formed by rolling a sheet medium to have a roll shape. The side guide of the first tray and the side guide of the second tray are different from each other in at least one of a length in the first direction, a length in the second direction, and a length in a third direction orthogonal to the support surface.

[1] An image recording apparatus includes a housing, a tray having a support surface for supporting a plurality of sheet media in a stacked state, movable in a first direction with respect to the housing, and configured to take an attached position where the tray is attached to the housing and a drawn-out position at an upstream side of the attached position in the first direction, a feeding mechanism configured to feed the sheet medium supported on the support surface from an upstream side toward a downstream side in the first direction, a recording unit configured to record an image on the sheet medium fed by the feeding mechanism, a separating member disposed at a downstream side in the first direction with respect to the support surface and extends in a third direction intersecting both the first direction and a second direction orthogonal to the support surface, and configured to come into contact with the sheet medium fed by the feeding mechanism to separate the sheet medium from the other sheet media, and a stopper configured to take an advanced position where the stopper is advanced to a conveyance path of the sheet medium along the separating member and a retreated position where the stopper is retreated from the conveyance path, and that moves from the advanced position to the retreated position when the tray moves from the drawn-out position to the attached position. The tray includes a first tray and a second tray. The separating member includes a first separating member corresponding to the first tray and a second separating member corresponding to the second tray, and a length of the second separating member in the third direction is longer than a length of the first separating member in the third direction.

[2] In the image recording apparatus according to [1], the stopper is not provided for the first tray.

[3] In the image recording apparatus according to [1] or [2], a plurality of the stoppers corresponding to the second tray are arranged symmetrically with respect to a virtual straight line passing through a center of the second separating member in a fourth direction orthogonal to both the first direction and the second direction.

[4] In the image recording apparatus according to [1], the stopper includes a first stopper corresponding to the first tray and a second stopper corresponding to the second tray, and an advancing amount of the second stopper to the conveyance path in the advanced position is larger than an advancing amount of the first stopper.

[5] An image recording apparatus includes a tray having a support surface for supporting a plurality of sheet media in a stacked state, a feeding mechanism configured to feed the sheet medium supported on the support surface from an upstream side toward a downstream side in a first direction along the support surface, a recording unit configured to record an image on the sheet medium fed by the feeding mechanism, and a separating member disposed at a downstream side in the first direction with respect to the support surface and extends in a third direction intersecting both the first direction and a second direction orthogonal to the support surface, and configured to come into contact with the sheet medium fed by the feeding mechanism to separate the sheet medium from the other sheet media. The tray includes a first tray and a second tray. The feeding mechanism includes a first feeding mechanism corresponding to the first tray and a second feeding mechanism corresponding to the second tray. The separating member includes a first separating member corresponding to the first tray and a second separating member corresponding to the second tray, and a length of the second separating member in the third direction is longer than a length of the first separating member in the third direction.

[6] In the image recording apparatus according to [5], the first separating member is slidable in the first direction, and slides so as to move to the downstream side in the first direction against an urging force of a first urging member when coming into contact with the sheet medium fed by the first feeding mechanism. The second separating member includes one end provided with a rotation shaft extending along a fourth direction orthogonal to both the first direction and the second direction, and another end opposite to the one end, and is rotatable about the rotation shaft, and when the second separating member comes into contact with the sheet medium fed by the second feeding mechanism, the second separating member rotates about the rotation shaft such that the other end moves to the downstream side in the first direction against an urging force of a second urging member.

[7] In the image recording apparatus according to [5], the first separating member is movable to the downstream side in the first direction against an urging force of a first urging member when coming into contact with the sheet medium fed by the first feeding mechanism. The second separating member is movable to the downstream side in the first direction against an urging force of a second urging member when coming into contact with the sheet medium fed by the second feeding mechanism. The urging force of the second urging member is larger than the urging force of the first urging member.

[8] An image recording apparatus includes a tray having a support surface for supporting a plurality of sheet media in a stacked state, a feeding mechanism configured to feed the sheet medium supported on the support surface from an upstream side toward a downstream side in a first direction along the support surface, a recording unit configured to record an image on the sheet medium fed by the feeding mechanism, and a separating member disposed at a downstream side in the first direction with respect to the support surface and extends in a third direction intersecting both the first direction and a second direction orthogonal to the support surface, and that comes into contact with the sheet medium fed by the feeding mechanism to separate the sheet medium from the other sheet media, and an uneven portion provided in a region extending in the third direction on a front surface of the separating member with which the sheet medium comes into contact, the uneven portion being formed of an unevenness repeated along the third direction. The tray includes a first tray and a second tray. The separating member includes a first separating member corresponding to the first tray and a second separating member corresponding to the second tray, and a length of the second separating member in the third direction is longer than a length of the first separating member in the third direction. The uneven portion is provided for at least one of the first separating member and the second separating member, and the number of uneven portions corresponding to the second separating member is larger than the number of uneven portions corresponding to the first separating member.

[9] The image recording apparatus according to [8], the uneven portion corresponding to the first separating member includes a protrusion made of metal, and the uneven portion corresponding to the second separating member includes a protrusion made of resin and does not include a protrusion made of metal.

[10] In the image recording apparatus according to any one of [1] to [9], the feeding mechanism includes a first arm that has one end and another end and is rotatable with the other end serving as a fulcrum, a first roller that is supported by the one end of the first arm, and is capable of contacting an uppermost sheet medium among a plurality of sheet media accommodated in the first tray to feed the sheet medium, a second arm that has one end and another end and is rotatable with the other end serving as a fulcrum, and a second roller that is supported by the one end of the second arm, and is capable of contacting an uppermost sheet medium among a plurality of sheet media accommodated in the second tray to feed the sheet medium.

[11] In the image recording apparatus according to any one of [1] to [10], the first tray and the second tray overlap in the second direction.

[12] In the image recording apparatus according to [1], the stopper is provided for at least one of the first tray and the second tray, and the number of stoppers corresponding to the second tray is larger than the number of stoppers corresponding to the first tray.

[13] In the image recording apparatus according to [5], the first separating member is fixed, and the second separating member is movable to the downstream side in the first direction against an urging force of an urging member when coming into contact with the sheet medium fed by the second feeding mechanism.

What is claimed is:

1. An image recording apparatus, comprising:

a first tray configured to accommodate first sheet media;

a second tray configured to accommodate second sheet media and overlapping the first tray in a first direction;

a first roller configured to feed the first sheet media accommodated in the first tray in a second direction intersecting the first direction, wherein the second direction extends from an upstream to a downstream of the first tray and the second tray;

a second roller configured to feed the second sheet media accommodated in the second tray in the second direction;

a first separating member disposed downstream of the first tray with respect to the first roller, extending in a third direction intersecting both the first direction and the second direction, and contacting the first sheet media fed from the first tray by the first roller to separate one of the first sheet media from the rest of the first sheet media;

a second separating member disposed at the downstream of the second tray with respect to the second roller, extending in the third direction, and contacting the second sheet media fed from the second tray by the second roller to separate one of the second sheet media from the rest of the second sheet media; and a recording unit configured to record an image on at least one of the first sheet media fed by the first roller and the second sheet media fed by the second roller, wherein a length of the second separating member in the third direction is longer than a length of the first separating member in the third direction, and wherein the second roller is positioned upstream of the first roller in the second direction in a state where no sheet media are accommodated in the first tray and the second tray.

2. The image recording apparatus according to claim 1, wherein a downstream end of the second separating member is located upstream of a downstream end of the first separating member in the second direction or the same position in the second direction same as the downstream end of the first separating member.

3. The image recording apparatus according to claim 1, further comprising:

a first arm having a first end and a second end spaced apart from the first end, the first end supporting the first roller, the first arm being rotatable about the second end serving as a first fulcrum; and a second arm having a first end and a second end spaced apart from the first end, the first end supporting the second roller, the second arm being rotatable about the second end serving as a second fulcrum, wherein a length from the second end of the second arm to a position where the second roller contacts the second sheet media is longer than a length from the second end of the first arm to a position where the first roller contacts the first sheet media.

4. The image recording apparatus according to claim 3, wherein a length from the second end of the second arm to the first end of the second arm is longer than a length from the second end of the first arm to the first end of the first arm.

5. An image recording apparatus, comprising:

a first tray configured to accommodate first sheet media;

a second tray configured to accommodate second sheet media and overlapping the first tray in a first direction;

a first roller configured to feed the first sheet media accommodated in the first tray from an upstream to a downstream of the first tray in a second direction intersecting the first direction;

a second roller configured to feed the second sheet media accommodated in the second tray from an upstream to a downstream of the second tray in the second direction;

a first arm having a first end and a second end spaced apart from the first end, the first end supporting the first roller, the first arm being rotatable about the second end serving as a first fulcrum;

a second arm having a first end and a second end spaced apart from the first end, the first end supporting the second roller, the second arm being rotatable about the second end serving as another fulcrum; and a recording unit configured to record an image on at least one of the first sheet media fed by the first roller and the second sheet media fed by the second roller, wherein the first end of the second arm is positioned upstream of the first end of the first arm in the second direction, wherein the second tray is configured to accommodate a roll body formed by rolling the second sheet medium to have a roll shape, and wherein a length from the second end of the first arm to a position where the first roller contacts the first sheet media is different from a length from the second end of the second arm to a position where the second roller contacts the second sheet media unrolled from the roll body.

6. The image recording apparatus according to claim 5, wherein the length from the other end of the second arm to the position where the second roller contacts the second sheet media is longer than the length from the other end of the first arm to the position where the first roller contacts the first sheet media.

7. The image recording apparatus according to claim 6, wherein a length from the second end of the second arm to the first end of the second arm is longer than a length from the second end of the first arm to the first end of the first arm.

8. The image recording apparatus according to claim 3, further comprising:

an urging member that urges the second arm in a direction in which the second roller separates from a medium support surface of the second tray.

9. The image recording apparatus according to claim 4, further comprising:

a plurality of first gears that are arranged from the other end toward the one end of the first arm and are coupled to each other, the first gear closest to the one end of the first arm among the first gears being coupled to the first roller;

a plurality of second gears that are arranged from the other end toward the one end of the second arm and are coupled to each other, the second gear closest to the one end of the second arm among the second gears being coupled to the second roller; and a transmission belt wound around one of the second gears for transmitting power to the one of the second gear.

10. The image recording apparatus according to claim 1, wherein the first direction is an up-down direction, and wherein the second tray is disposed below the first tray.

* * * * *